United States Patent
Valois et al.

(10) Patent No.: US 9,379,578 B2
(45) Date of Patent: Jun. 28, 2016

(54) SYSTEMS AND METHODS FOR MULTI-STATE POWER MANAGEMENT

(71) Applicant: INTEGRATED ILLUMINATION SYSTEMS, INC., Morris, CT (US)

(72) Inventors: Charles Valois, Westford, MA (US); Thomas Lawrence Zampini, II, Bedford, MA (US)

(73) Assignee: Integrated Illumination Systems, Inc., Morris, CT (US)

( * ) Notice: Subject to any disclaimer, the term of this patent is extended or adjusted under 35 U.S.C. 154(b) by 673 days.

(21) Appl. No.: 13/680,949

(22) Filed: Nov. 19, 2012

(65) Prior Publication Data

US 2014/0139122 A1    May 22, 2014

(51) Int. Cl.
| | |
|---|---|
| H05B 37/00 | (2006.01) |
| H02J 9/02 | (2006.01) |
| H05B 33/08 | (2006.01) |
| H02J 9/06 | (2006.01) |
| H02J 1/10 | (2006.01) |

(52) U.S. Cl.
CPC ... *H02J 9/02* (2013.01); *H02J 9/06* (2013.01); *H05B 33/0851* (2013.01); *H02J 1/108* (2013.01); *Y10T 307/658* (2015.04)

(58) Field of Classification Search
CPC .. H05B 37/029; H05B 37/0272; Y02B 20/48; F21S 9/022; F21V 23/0442; Y10T 307/625
See application file for complete search history.

(56) References Cited

U.S. PATENT DOCUMENTS

| | | |
|---|---|---|
| 4,139,770 A | 2/1979 | Beyersdorf |
| 5,264,997 A | 11/1993 | Hutchisson et al. |
| 5,465,199 A | 11/1995 | Bray et al. |
| 5,561,346 A | 10/1996 | Byrne |
| 5,659,582 A | 8/1997 | Kojima et al. |
| 5,783,909 A | 7/1998 | Hochstein |
| 5,803,579 A | 9/1998 | Turnbull et al. |
| 5,909,429 A | 6/1999 | Satyanarayana et al. |
| 5,947,587 A | 9/1999 | Keuper et al. |

(Continued)

FOREIGN PATENT DOCUMENTS

| | | |
|---|---|---|
| WO | WO-03/017733 A1 | 2/2003 |

OTHER PUBLICATIONS

"1-Wire Products Deliver a Powerful Combination . . . ", Mixed-Signal Design Guide, Dallas Semiconductor Maxim, 2005, 7 pages.

(Continued)

*Primary Examiner* — Douglas W Owens
*Assistant Examiner* — Monica C. King
(74) *Attorney, Agent, or Firm* — Foley & Lardner LLP; Christopher J. McKenna

(57) ABSTRACT

The present disclosure is directed to a solution providing multi-state power management. In some aspects, the design of the multi-state power management system (MPMS) facilitates switching to battery back up power upon identifying a power outage and further controlling the intensity level of a load (e.g., a light source) such that the light run time meets a minimum required run time. The MPMS may be designed and configured to identify a power outage and a battery status based on the voltage at a voltage input of the lighting device. The design may also include controlling the intensity level of the light source responsive to temperature measurements, e.g., ambient temperature or the temperature of one or more components, to maintain the health of the system.

12 Claims, 5 Drawing Sheets

(56) References Cited

U.S. PATENT DOCUMENTS

| | | |
|---|---|---|
| 6,013,988 A | 1/2000 | Bucks et al. |
| 6,016,038 A | 1/2000 | Mueller et al. |
| 6,040,663 A | 3/2000 | Bucks et al. |
| 6,094,014 A | 7/2000 | Bucks et al. |
| 6,127,783 A | 10/2000 | Pashley et al. |
| 6,147,458 A | 11/2000 | Bucks et al. |
| 6,150,774 A | 11/2000 | Mueller et al. |
| 6,157,093 A | 12/2000 | Giannopoulos et al. |
| 6,166,496 A | 12/2000 | Lys et al. |
| 6,194,839 B1 | 2/2001 | Chang |
| 6,201,353 B1 | 3/2001 | Chang et al. |
| 6,211,626 B1 | 4/2001 | Lys et al. |
| 6,234,645 B1 | 5/2001 | Borner et al. |
| 6,234,648 B1 | 5/2001 | Borner et al. |
| 6,236,331 B1 | 5/2001 | Dussureault |
| 6,238,065 B1 | 5/2001 | Jones |
| 6,249,088 B1 | 6/2001 | Chang |
| 6,250,774 B1 | 6/2001 | Begemann et al. |
| 6,253,530 B1 | 7/2001 | Price et al. |
| 6,288,497 B1 | 9/2001 | Chang et al. |
| 6,292,901 B1 | 9/2001 | Lys et al. |
| 6,299,329 B1 | 10/2001 | Mui et al. |
| 6,304,464 B1 | 10/2001 | Jacobs et al. |
| 6,305,818 B1 | 10/2001 | Lebens et al. |
| 6,340,864 B1 | 1/2002 | Wacyk |
| 6,340,868 B1 | 1/2002 | Lys et al. |
| 6,384,545 B1 | 5/2002 | Lau |
| 6,411,046 B1 | 6/2002 | Muthu |
| 6,441,558 B1 | 8/2002 | Muthu et al. |
| 6,443,592 B1 | 9/2002 | Unger et al. |
| 6,445,139 B1 | 9/2002 | Marshall et al. |
| 6,459,919 B1 | 10/2002 | Lys et al. |
| 6,489,731 B1 | 12/2002 | Bruning et al. |
| 6,495,964 B1 | 12/2002 | Muthu et al. |
| 6,507,158 B1 | 1/2003 | Wang |
| 6,507,159 B2 | 1/2003 | Muthu |
| 6,510,995 B2 | 1/2003 | Muthu et al. |
| 6,513,949 B1 | 2/2003 | Marshall et al. |
| 6,528,954 B1 | 3/2003 | Lys et al. |
| 6,552,495 B1 | 4/2003 | Chang |
| 6,576,881 B2 | 6/2003 | Muthu et al. |
| 6,577,080 B2 | 6/2003 | Lys et al. |
| 6,577,512 B2 | 6/2003 | Tripathi et al. |
| 6,580,309 B2 | 6/2003 | Jacobs et al. |
| 6,586,890 B2 | 7/2003 | Min et al. |
| 6,596,977 B2 | 7/2003 | Muthu et al. |
| 6,608,453 B2 | 8/2003 | Morgan et al. |
| 6,609,813 B1 | 8/2003 | Showers et al. |
| 6,617,795 B2 | 9/2003 | Bruning |
| 6,621,235 B2 | 9/2003 | Chang |
| 6,630,801 B2 | 10/2003 | Schuurmans |
| 6,636,003 B2 | 10/2003 | Rahm et al. |
| 6,639,368 B2 | 10/2003 | Sheoghong |
| 6,676,284 B1 | 1/2004 | Wynne Willson |
| 6,692,136 B2 | 2/2004 | Marshall et al. |
| 6,720,745 B2 | 4/2004 | Lys et al. |
| 6,724,159 B2 | 4/2004 | Gutta et al. |
| 6,734,639 B2 | 5/2004 | Chang et al. |
| 6,741,351 B2 | 5/2004 | Marshall et al. |
| 6,762,562 B2 | 7/2004 | Leong |
| 6,777,891 B2 | 8/2004 | Lys et al. |
| 6,788,011 B2 | 9/2004 | Mueller et al. |
| 6,796,680 B1 | 9/2004 | Showers et al. |
| 6,796,686 B2 | 9/2004 | Jacob et al. |
| 6,801,003 B2 | 10/2004 | Schanberger et al. |
| 6,806,659 B1 | 10/2004 | Mueller et al. |
| 6,831,569 B2 | 12/2004 | Wang et al. |
| 6,853,150 B2 | 2/2005 | Clauberg et al. |
| 6,853,151 B2 | 2/2005 | Leong et al. |
| 6,859,644 B2 | 2/2005 | Wang |
| 6,922,022 B2 | 7/2005 | Bucks et al. |
| 6,930,452 B2 | 8/2005 | De Krijger et al. |
| 6,932,477 B2 | 8/2005 | Stanton |
| 6,933,685 B2 | 8/2005 | Gutta et al. |
| 6,933,767 B2 | 8/2005 | Bucks et al. |
| 6,965,205 B2 | 11/2005 | Piepgras et al. |
| 6,969,954 B2 | 11/2005 | Lys |
| 6,972,525 B2 | 12/2005 | Bucks et al. |
| 6,975,079 B2 | 12/2005 | Lys et al. |
| 6,992,803 B2 | 1/2006 | Chang |
| 6,998,594 B2 | 2/2006 | Gaines et al. |
| 7,014,336 B1 | 3/2006 | Ducharme et al. |
| 7,030,572 B2 | 4/2006 | Nijhof et al. |
| 7,031,920 B2 | 4/2006 | Dowling et al. |
| 7,038,398 B1 | 5/2006 | Lys et al. |
| 7,038,399 B2 | 5/2006 | Lys et al. |
| 7,064,498 B2 | 6/2006 | Dowling et al. |
| 7,067,992 B2 | 6/2006 | Leong et al. |
| 7,071,762 B2 | 7/2006 | Xu et al. |
| 7,113,541 B1 | 9/2006 | Lys et al. |
| 7,118,248 B2 | 10/2006 | Wynne Willson |
| 7,132,804 B2 | 11/2006 | Lys et al. |
| 7,135,824 B2 | 11/2006 | Lys et al. |
| 7,139,617 B1 | 11/2006 | Morgan et al. |
| 7,140,752 B2 | 11/2006 | Ashdown |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,178,941 B2 | 2/2007 | Roberge et al. |
| 7,180,252 B2 | 2/2007 | Lys et al. |
| 7,186,003 B2 | 3/2007 | Dowling et al. |
| 7,202,608 B2 | 4/2007 | Robinson et al. |
| 7,202,613 B2 | 4/2007 | Morgan et al. |
| 7,202,641 B2 | 4/2007 | Claessens et al. |
| 7,204,622 B2 | 4/2007 | Dowling et al. |
| 7,221,104 B2 | 5/2007 | Lys et al. |
| 7,228,190 B2 | 6/2007 | Dowling et al. |
| 7,231,060 B2 | 6/2007 | Dowling et al. |
| 7,233,115 B2 | 6/2007 | Lys |
| 7,233,831 B2 | 6/2007 | Blackwell |
| 7,242,152 B2 | 7/2007 | Dowling et al. |
| 7,253,566 B2 | 8/2007 | Lys et al. |
| 7,255,457 B2 | 8/2007 | Ducharme et al. |
| 7,255,458 B2 | 8/2007 | Ashdown |
| 7,256,554 B2 | 8/2007 | Lys |
| 7,262,559 B2 | 8/2007 | Tripathi et al. |
| 7,267,461 B2 | 9/2007 | Kan et al. |
| 7,274,160 B2 | 9/2007 | Mueller et al. |
| 7,300,192 B2 | 11/2007 | Mueller et al. |
| 7,308,296 B2 | 12/2007 | Lys et al. |
| 7,309,965 B2 | 12/2007 | Dowling et al. |
| 7,314,289 B2 | 1/2008 | Montagne |
| 7,319,298 B2 | 1/2008 | Jungwirth et al. |
| 7,323,676 B2 | 1/2008 | Duijve |
| 7,329,998 B2 | 2/2008 | Jungwirth |
| 7,350,936 B2 | 4/2008 | Ducharme et al. |
| 7,352,138 B2 | 4/2008 | Lys et al. |
| 7,352,339 B2 | 4/2008 | Morgan et al. |
| 7,353,071 B2 | 4/2008 | Blackwell et al. |
| 7,354,172 B2 | 4/2008 | Chemel et al. |
| 7,358,679 B2 | 4/2008 | Lys et al. |
| 7,358,681 B2 | 4/2008 | Robinson et al. |
| 7,358,706 B2 | 4/2008 | Lys |
| 7,358,929 B2 | 4/2008 | Mueller et al. |
| 7,358,961 B2 | 4/2008 | Zwanenburg |
| 7,387,405 B2 | 6/2008 | Ducharme et al. |
| 7,388,665 B2 | 6/2008 | Ashdown |
| 7,394,210 B2 | 7/2008 | Ashdown |
| 7,420,335 B2 | 9/2008 | Robinson et al. |
| 7,423,387 B2 | 9/2008 | Robinson et al. |
| 7,432,668 B2 | 10/2008 | Zwanenburg et al. |
| 7,443,209 B2 | 10/2008 | Chang |
| 7,449,847 B2 | 11/2008 | Schanberger et al. |
| 7,453,217 B2 | 11/2008 | Lys et al. |
| 7,459,864 B2 | 12/2008 | Lys |
| 7,462,997 B2 | 12/2008 | Mueller et al. |
| 7,463,070 B2 | 12/2008 | Wessels |
| 7,482,565 B2 | 1/2009 | Morgan et al. |
| 7,482,760 B2 | 1/2009 | Jungwirth et al. |
| 7,490,953 B2 | 2/2009 | Holten et al. |
| 7,490,957 B2 | 2/2009 | Leong et al. |
| 7,495,671 B2 | 2/2009 | Chemel et al. |
| 7,502,034 B2 | 3/2009 | Chemel et al. |
| 7,505,395 B2 | 3/2009 | Ashdown et al. |

(56) References Cited

U.S. PATENT DOCUMENTS

| | | |
|---|---|---|
| 7,507,001 B2 | 3/2009 | Kit |
| 7,511,436 B2 | 3/2009 | Xu |
| 7,511,437 B2 | 3/2009 | Lys et al. |
| 7,515,128 B2 | 4/2009 | Dowling |
| 7,520,634 B2 | 4/2009 | Ducharme et al. |
| 7,521,872 B2 | 4/2009 | Bruning |
| 7,525,254 B2 | 4/2009 | Lys et al. |
| 7,538,499 B2 | 5/2009 | Ashdown |
| 7,542,257 B2 | 6/2009 | McCormick et al. |
| 7,550,931 B2 | 6/2009 | Lys et al. |
| 7,550,935 B2 | 6/2009 | Lys et al. |
| 7,557,521 B2 | 7/2009 | Lys |
| 7,569,807 B2 | 8/2009 | Matheson |
| 7,572,028 B2 | 8/2009 | Mueller et al. |
| 7,573,209 B2 | 8/2009 | Ashdown et al. |
| 7,573,210 B2 | 8/2009 | Ashdown et al. |
| 7,573,729 B2 | 8/2009 | Elferich et al. |
| 7,598,681 B2 | 10/2009 | Lys et al. |
| 7,598,684 B2 | 10/2009 | Lys et al. |
| 7,598,686 B2 | 10/2009 | Lys et al. |
| 7,619,370 B2 | 11/2009 | Chemel et al. |
| 7,652,236 B2 | 1/2010 | Cortenraad et al. |
| 7,654,703 B2 | 2/2010 | Kan et al. |
| 7,656,366 B2 | 2/2010 | Ashdown |
| 7,658,506 B2 | 2/2010 | Dowling |
| 7,659,673 B2 | 2/2010 | Lys |
| 7,659,674 B2 | 2/2010 | Mueller et al. |
| 7,665,883 B2 | 2/2010 | Matheson |
| 7,667,409 B2 | 2/2010 | Geerts et al. |
| 7,675,238 B2 | 3/2010 | Cortenraad et al. |
| 7,687,753 B2 | 3/2010 | Ashdown |
| 7,688,002 B2 | 3/2010 | Ashdown et al. |
| 7,689,130 B2 | 3/2010 | Ashdown |
| 7,703,951 B2 | 4/2010 | Piepgras et al. |
| 7,710,369 B2 | 5/2010 | Dowling |
| 7,712,926 B2 | 5/2010 | Matheson |
| 7,714,521 B2 | 5/2010 | Qian |
| 7,731,387 B2 | 6/2010 | Cortenraad et al. |
| 7,731,389 B2 | 6/2010 | Draganov et al. |
| 7,731,390 B2 | 6/2010 | Van Gorkom et al. |
| 7,737,643 B2 | 6/2010 | Lys |
| 7,738,002 B2 | 6/2010 | Ashdown et al. |
| 7,740,375 B2 | 6/2010 | Zou et al. |
| 7,766,489 B2 | 8/2010 | Duine et al. |
| 7,766,518 B2 | 8/2010 | Piepgras et al. |
| 7,772,787 B2 | 8/2010 | Ashdown et al. |
| 7,777,427 B2 | 8/2010 | Stalker, III |
| 7,781,979 B2 | 8/2010 | Lys |
| 7,802,902 B2 | 9/2010 | Moss et al. |
| 7,806,558 B2 | 10/2010 | Williamson |
| 7,808,191 B2 | 10/2010 | Wu |
| 7,809,448 B2 | 10/2010 | Lys et al. |
| 7,810,974 B2 | 10/2010 | Van Rijswick et al. |
| 7,845,823 B2 | 12/2010 | Mueller et al. |
| 7,850,347 B2 | 12/2010 | Speier et al. |
| 7,854,539 B2 | 12/2010 | Van Duijneveldt |
| 7,868,562 B2 | 1/2011 | Salsbury et al. |
| 7,878,683 B2 | 2/2011 | Logan et al. |
| 7,878,688 B2 | 2/2011 | Paulussen et al. |
| 7,893,631 B2 | 2/2011 | Speier |
| 7,893,661 B2 | 2/2011 | Ackermann et al. |
| 7,894,050 B2 | 2/2011 | Ashdown et al. |
| 7,906,917 B2 | 3/2011 | Tripathi et al. |
| 7,911,151 B2 | 3/2011 | Xu |
| 7,914,173 B2 | 3/2011 | Paulussen et al. |
| 8,022,632 B2 | 9/2011 | Schulz et al. |
| 8,026,673 B2 | 9/2011 | Lys |
| 2002/0074559 A1 | 6/2002 | Dowling et al. |
| 2003/0132721 A1 | 7/2003 | Jacobs et al. |
| 2003/0133292 A1 | 7/2003 | Mueller et al. |
| 2004/0052076 A1 | 3/2004 | Mueller et al. |
| 2004/0090191 A1 | 5/2004 | Mueller et al. |
| 2004/0178751 A1 | 9/2004 | Mueller et al. |
| 2005/0236998 A1 | 10/2005 | Mueller et al. |
| 2005/0275626 A1 | 12/2005 | Mueller et al. |
| 2006/0002110 A1 | 1/2006 | Dowling et al. |
| 2006/0076908 A1 | 4/2006 | Morgan et al. |
| 2006/0114201 A1 | 6/2006 | Chang |
| 2006/0152172 A9 | 7/2006 | Mueller et al. |
| 2006/0221606 A1 | 10/2006 | Dowling |
| 2006/0262521 A1 | 11/2006 | Piepgras et al. |
| 2006/0274526 A1 | 12/2006 | Weston et al. |
| 2006/0290624 A1 | 12/2006 | Ashdown |
| 2007/0063658 A1 | 3/2007 | Van Der Veeken |
| 2007/0086912 A1 | 4/2007 | Dowling et al. |
| 2007/0115658 A1 | 5/2007 | Mueller et al. |
| 2007/0145915 A1 | 6/2007 | Roberge et al. |
| 2007/0153514 A1 | 7/2007 | Dowling et al. |
| 2007/0230159 A1 | 10/2007 | Cortenraad et al. |
| 2007/0258240 A1 | 11/2007 | Ducharme et al. |
| 2007/0273290 A1 | 11/2007 | Ashdown et al. |
| 2008/0042599 A1 | 2/2008 | Ashdown |
| 2008/0043464 A1 | 2/2008 | Ashdown |
| 2008/0048582 A1 | 2/2008 | Robinson |
| 2008/0062413 A1 | 3/2008 | Ashdown et al. |
| 2008/0089060 A1 | 4/2008 | Kondo et al. |
| 2008/0094005 A1 | 4/2008 | Rabiner et al. |
| 2008/0122386 A1 | 5/2008 | De Brouwer et al. |
| 2008/0136331 A1 | 6/2008 | Schmeikal |
| 2008/0136796 A1 | 6/2008 | Dowling |
| 2008/0140231 A1 | 6/2008 | Blackwell et al. |
| 2008/0164826 A1 | 7/2008 | Lys |
| 2008/0164854 A1 | 7/2008 | Lys |
| 2008/0167734 A1 | 7/2008 | Robinson et al. |
| 2008/0183081 A1 | 7/2008 | Lys et al. |
| 2008/0239675 A1 | 10/2008 | Speier |
| 2008/0265797 A1 | 10/2008 | Van Doorn |
| 2008/0278092 A1 | 11/2008 | Lys et al. |
| 2008/0278941 A1 | 11/2008 | Logan et al. |
| 2008/0290251 A1 | 11/2008 | Deurenberg et al. |
| 2008/0297066 A1 | 12/2008 | Meijer et al. |
| 2008/0298330 A1 | 12/2008 | Leitch |
| 2008/0315798 A1 | 12/2008 | Diederiks et al. |
| 2009/0002981 A1 | 1/2009 | Knibbe |
| 2009/0021175 A1 | 1/2009 | Wendt et al. |
| 2009/0021182 A1 | 1/2009 | Sauerlaender |
| 2009/0072761 A1 | 3/2009 | Wessels |
| 2009/0128059 A1 | 5/2009 | Joosen et al. |
| 2009/0134817 A1 | 5/2009 | Jurngwirth et al. |
| 2009/0160364 A1 | 6/2009 | Ackermann et al. |
| 2009/0168415 A1 | 7/2009 | Deurenberg et al. |
| 2009/0179587 A1 | 7/2009 | Van Der Veen et al. |
| 2009/0179596 A1 | 7/2009 | Willaert et al. |
| 2009/0189448 A1 | 7/2009 | Verschueren |
| 2009/0224695 A1 | 9/2009 | Van Erp et al. |
| 2009/0230884 A1 | 9/2009 | Van Doorn |
| 2009/0243507 A1 | 10/2009 | Lucero-Vera et al. |
| 2009/0278473 A1 | 11/2009 | Van Erp |
| 2009/0284174 A1 | 11/2009 | Sauerlander et al. |
| 2009/0321666 A1 | 12/2009 | Hilgers |
| 2010/0007600 A1 | 1/2010 | Deurenberg et al. |
| 2010/0026191 A1 | 2/2010 | Radermacher et al. |
| 2010/0045478 A1 | 2/2010 | Schulz et al. |
| 2010/0072901 A1 | 3/2010 | De Rijck et al. |
| 2010/0072902 A1 | 3/2010 | Wendt et al. |
| 2010/0079085 A1 | 4/2010 | Wendt et al. |
| 2010/0079091 A1 | 4/2010 | Deixler et al. |
| 2010/0084995 A1 | 4/2010 | Baaijens et al. |
| 2010/0091488 A1 | 4/2010 | Ijzerman et al. |
| 2010/0094439 A1 | 4/2010 | Van De Meulenhof et al. |
| 2010/0102732 A1 | 4/2010 | Peeters et al. |
| 2010/0117543 A1 | 5/2010 | Van Der Veen et al. |
| 2010/0117656 A1 | 5/2010 | Snelten |
| 2010/0118531 A1 | 5/2010 | Montagne |
| 2010/0127633 A1 | 5/2010 | Geerts et al. |
| 2010/0134041 A1 | 6/2010 | Radermacher et al. |
| 2010/0134042 A1 | 6/2010 | Willaert |
| 2010/0134066 A1* | 6/2010 | Xiao ............ H02J 7/32 320/107 |
| 2010/0141153 A1* | 6/2010 | Recker .......... H05B 33/0803 315/149 |
| 2010/0148689 A1 | 6/2010 | Morgan et al. |
| 2010/0164399 A1 | 7/2010 | Radermacher et al. |
| 2010/0165618 A1 | 7/2010 | Vissenberg et al. |

(56) References Cited

U.S. PATENT DOCUMENTS

| | | |
|---|---|---|
| 2010/0171771 A1 | 7/2010 | Otte et al. |
| 2010/0181936 A1 | 7/2010 | Radermacher et al. |
| 2010/0188007 A1 | 7/2010 | Deppe et al. |
| 2010/0194293 A1 | 8/2010 | Deurenberg et al. |
| 2010/0231133 A1 | 9/2010 | Lys |
| 2010/0231363 A1 | 9/2010 | Knibbe |
| 2010/0244707 A1 | 9/2010 | Gaines et al. |
| 2010/0244734 A1 | 9/2010 | Van Herpen et al. |
| 2010/0259182 A1 | 10/2010 | Man et al. |
| 2010/0264834 A1 | 10/2010 | Gaines et al. |
| 2010/0271843 A1 | 10/2010 | Holten et al. |
| 2010/0289532 A1 | 11/2010 | Wendt et al. |
| 2010/0301774 A1* | 12/2010 | Chemel ............... H05B 37/029 315/297 |
| 2010/0301780 A1 | 12/2010 | Vinkenvleugel |
| 2010/0308745 A1 | 12/2010 | Delnoij |
| 2011/0025205 A1 | 2/2011 | Van Rijswick et al. |
| 2011/0025230 A1 | 2/2011 | Schulz et al. |
| 2011/0035404 A1 | 2/2011 | Morgan et al. |
| 2011/0042554 A1 | 2/2011 | Hilgers et al. |
| 2011/0090684 A1 | 4/2011 | Logan et al. |
| 2011/0095694 A1 | 4/2011 | Justel et al. |
| 2011/0285292 A1 | 11/2011 | Mollnow et al. |
| 2011/0291812 A1 | 12/2011 | Verbrugh |
| 2012/0019670 A1 | 1/2012 | Chang et al. |

OTHER PUBLICATIONS

"Conductivity with the BS2/OWL2", EME Systems, 2002, pp. 1-3.
"Dimmable Fluorescent Ballast", ATAVRFBKIT/EVLB001, User Guide, ATMEL, 2007, pp. 1-33.
"High-side current sensing for driving a string of white LEDs", EDN, 1 page.
"Understanding Boost Power Stages in Switchmode Power Supplies", Application Report, Texas Instruments, Mixed Signal Products, Mar. 1999, pp. 1-28.
"Understanding Buck Power Stages in Switchmode Power Supplies", Application Report, Texas Instruments, Mixed Signal Products, Mar. 1999, pp. 1-32.
Barberis, C. "Precision current sink costs less than $20", EDN Design Ideas.
Bellcomb Technologies Incorporated, "Edges, Joiners, Attachments", Web Address: http://www.bellcomb.com/caps/edges.htm, Apr. 22, 2007, pp. 1-3.
Bookmarks Menu—Controllers/Wireless—Design Ideas, dated Dec. 6, 2012, 1 pg.
Bowling, S. "Buck-Boost LED Driver Using the PIC16F785 MCU", Microchip, AN1047, 2006, pp. 1-12.
By Staff, DALI Delivers Control and Cost Savings, Headaches Too, Consulting-Specifying Engineer, Jun. 2002, 2 pages.
Canny, D. "Controlling slew times tames EMI in offline supplies", EDN Design Ideas, Nov. 14, 2002.
Control Freak Addict Data Sheet, Copyright 2008, Creative Lighting, 5 pages.
Curtis, K. "High Power IR LED Driver Using the PIC16C781/782", Microchip, TB062, 2002, pp. 1-8.
CybroTech, Managing Lights with Dali, TN-012, rev 2, Cybrotech Ltd., 2007, 11 pgs.
Cypress Perform, Implementing an Integrated DMX512 Receiver, Item ID: 39762, Dec. 16, 2009, 1 pg.
Cypress Semiconductor Corporation, PowerPSoC (R) Intelligent LED Driver, Document No. 001-46319, Rev. G, 2009.
Dali-AG website, Dali at work, 1 pg.
Davidovic, et al., Lead-Acid Battery Charger Becomes a Subfuction in a Microcontroller, The Authority on Emerging Technologies for Design Solutions, Mar. 2007, 2 pages.
Davmark Ltd., Dali-Protocol, 2007, 6 pages.
Di Jasio, "A Technique to Increase the Frequency Resolution of PICmicro MCU PWM Modules", Microchip, AN1050, 2006, pp. 1-10.
Dietz, et al. "Very Low-Cost Sensing and Communication Using Bidirectional LEDs", Mitsubishi Electric Research Laboratories, Jul. 2003, 19 pgs.
Distler, T. "LED Effects Stream TM v2.0 Protocol (Revision C)", Jun. 2, 2005, pp. 1-5.
Dunn, J. "Matching MOSFET Drivers to MOSEFTs", Microchip, AN799, 2004, pp. 1-10.
Fosler, R. "The RS-232/DALI Bridge Interface", Microchip, AN811, 2002, pp. 1-8.
Fosler, R. "Use a microcontroller to design a boost converter", EDN design ideas, Mar. 4, 2004, pp. 74-75.
Fosler, R., et al. "Digitally Addressable DALI Dimming Ballast", Microchip, AN809, 2002, pp. 1-18.
Ghulyani, L. "Simple MPPT-Based Lead Acid Charger Using bq2031", Texas Instruments, Dec. 2009, pp. 1-5.
Google Search Results for dali query group, search completed on Apr. 8, 2010, accessed at google.com, http://www.google.com/search?hl=en&client=firefox-a&rls=org.mozilla:en-, 2 pages.
Hardwick, M. "DC power wire also carries clock or data", EDN Design Ideas.
Hexcel Composites, "Sandwich Panel Fabrication Technology", Web Address: http://www.hexcel.com/NR/rdonlyres/B4574C2C-0644-43AC-96E2-CC15967A4b)5/4547 Sandwich Fabrication.pdf, Jan. 1997, pp. 1-16.
High-Side Current Monitor, ZETEX, Apr. 2001, ZXCT1009, Issue 3, pp. 1-8.
Implementing Infrared Object Detection, http://web.archive.org/web/20080528042614rejwww.seattlerobotics.org/guide/infrared.html, original publication date known, retrieved Apr. 7, 2010, seattlerobotics.org, 4 pages.
Jackson, S. "Circuit protects bus from 5V swings", EDN Design Ideas, Nov. 14, 2002.
Klepin, K. "Temperature Compensation for High Brightness LEDs using EZ-Color (TM) and PSoC Express", Cypress Perform, AN14406, Aug. 10, 2007, pp. 1-4.
Kremin, V. et al. "Multichannel LED Dimmer with CapSense Control—AN13943", Cypress Perform, Jul. 20, 2007.
Kropf, B. "Firmware—RGB Color Mixing Firmware for EZ-Color (TM)—AN16035", Cypress Perform, Jun. 13, 2007, pp. 1-7.
Lager, A. "Use a 555 timer as a switch-mode power supply", EDN Design Ideas, Nov. 14, 2002.
Lee, M. Shunt Battery Charger Provides 1A Continuous Current, EDN Magazine, 1997.
Locher, R. "Introduction to Power MOSEFETs and their Applications", Fairchild Semiconductor (TM), Application Note 558, Rev B, Oct. 1998, 15 pgs.
Miller, R. "Digital addressable lighting interface protocol fosters systems interoperability for lower costs and greater design flexibility", RNM Engineering, Inc., Apr. 2003, pp. 1-20.
Nell, S. "VCO uses programmable logic", EDN Design Ideas, Nov. 14, 2002.
News & Events DALI Digital addressable lighting interface lamp luminaire control, accessed at http://www.dali-ag.org/ on Apr. 8, 2010, original publication date unknown, updated Apr. 8, 2010, 1 pg.
O'Loughlin, M. "350-W, Two-Phase Interleaved PFC Pre-regulator Design Review", Texas Instruments, Application Report, Revised Mar. 2007, pp. 1.
O'Loughlin, M., PFC Pre-Regulator Frequency Dithering Circuit, Texas Instruments, May 2007, pp. 1-8.
Perrin, R. Inexpensive Relays Form Digital Potentiometer, EDN Design Ideas, 1998, 2 pages.
Petersen, A. "Harness solar power with smart power-conversion techniques", EDN, Green Electronics designfeature, Feb. 4, 1999, pp. 119-124.
Prendergast, P. "How to Design a Three-Channel LED Driver", Cypress Perform, Jan. 2008, pp. 1-9.
Renesas, R8C/25 Demonstration Example for DALI Lighting Protocol Stack, REU05B0077-0100/Rev. 1.00, Jul. 2008, 14 pgs.
Richardson, C., Matching Driver to LED, National Semiconductor, Jan. 2008, 5 pgs.
Richardson. C., LM3404 Driving a Seoul Semi Zpower P4 1A LED-RD-134, National Semiconductor, Apr. 2007, 6 pages.

(56) References Cited

OTHER PUBLICATIONS

Shanmugam, S. "Design of a linear Fresnel lens system for solar photovoltaic electrical power source", Center for Robotics Research.
Shill, M. "Simple logic probe uses bicolor LED", EDN Design Ideas.
Software Design Specification, Z-Wave Protocol Overview, Z wave the wireless language, Zensys A/S, May 9, 2007, pp. 1-16.
Soundlight, Operating Manual, DALI and DMX Dekoder 7064A-H Mk1, 2008, 8 pgs.
Takahashi A., Methods and Features of LED Drivers, National Semiconductor, Mar. 2008, 3 pgs.
Universal Powerline Bus Communication Technology, Overview, PCS Powerline Control Systems UPB (Universal Powerline Bus), Jan. 8, 2002, pp. 1-13.
UPB Technology Description, PCS—Powerline Control Systems, UPB (Universal Powerline Bus), Version 1.4, Apr. 16, 2007, 68 pages.
Use Gate Charge to Design the Gate Drive Circuit for Power MOSEFETs and IGBTs, International Rectifier, Application Note AN-944, 5 pgs.
Van Dorsten, Arian, A Low Cost Step-up Converter by IC 555, posted Jul. 21, 2007, http://www.eleccircuit.comla-low-cost-step-up-converter-by-ic-5551, retrieved Apr. 7, 2010, 2 pages.
Walma, K., DALI: Forerunner of Today's Breakthrough Lighting Technology, Feb. 2007, 2 pages.
Wikipedia, Digital Addressable Lighting Interface, original publication date unknown, Retrieved from:Retrieved from "http://en.wikipedia.org/wikiJDigital_Addressable_Lighting_Interface" accessed on Apr. 8, 2010, 3 pages.
Witt, J. "Switched-capacitor regulator provides gain", EDN Design Ideas.
Wojslaw, C. "DPP adds versatility to VFC", EDN, design ideas, Nov. 14, 2002, pp. 99-110.
Young, R. "Power circuit terminates DDR DRAMs", EDN Design Ideas, Nov. 14, 2002.
Zarr, R. Driving High-Power LEDs, Machine Design, Oct. 2007, 3 pages.
Zensys ASCII Interface, VIZIA, 2007.
Z-Wave Vizia Etc thread, retrieved at http://groups.google.com/group/comp.home.automation/browse_thread/thread/449c2c66934dfSfb/fSI12116a8231aa1?Ink=st&q=z-wave&rnum=98#fSI12116a8231aa1, www.ztech.com, 18 pages.

* cited by examiner

SYSTEMS AND METHODS FOR MULTI-STATE POWER MANAGEMENT

FIELD OF THE INVENTION

The present application is generally related to managing power use. In particular, the present application is directed to systems and methods for managing and controlling the battery power use of lighting fixtures and the deployment of such lighting fixtures.

BACKGROUND

When remote sites lose power, emergency backup systems typically go on right away to provide battery power to various components. However, the battery of the emergency backup system may expend all their energy prior to personnel arriving at the remote site.

SUMMARY

The present disclosure is directed to an intelligent multi-state power management system that can manage battery usage based on the state of the system. In some aspects, the multi-state power management system ("MPMS") may use power at a reduced rate based on the battery level and/or temperature to extend battery usage age. For example, the MPMS may reduce the intensity of an LED based on the battery state and/or temperature such that the LED can run on battery power for a predetermined amount of time.

In some embodiments, the MPMS includes an LED fixture, a first power supply (e.g., 24V), a second power supply (e.g., 14V DC) and a battery (e.g., 12V). The LED includes two wires connected to the LED (e.g., + & −). The output of the battery and first power supply may be connected with diodes to the LED, such that should the 24V on the first power supply terminate or drop out, the 12V on the battery will power the LED fixture. In some embodiments, the first power supply and battery is coupled to the LED such that one of the first power supply and the battery will power the LED at a given time. In some embodiments, the battery may be charged by the second power supply, which may be any power supply suitable for charging the battery, including, e.g., a 14V DC power supply.

During operation, the LED fixture may be powered by the first power supply and the battery may be charged by the second power supply. Depending on the battery state, the battery may be trickle charging, fast charging, charging, or not charging. When the first power supply is turned off (e.g., open switch or a power outage), the MPMS decides whether to enter an 'off state' or enter a 'battery state'. The off state refers to a state in which the light fixture is powered up by the battery (e.g., micro amps), but the MPMS shuts down the LEDs to effectively turn the lights off. The MPMS may enter this state if a user intends to turn the lights off. The battery state refers to a state in which the line voltage to the MPMS has disappeared (e.g., a power outage). In some embodiments, this may reflect an emergency state and the MPMS may turn the light on using battery power.

To determine whether to enter the off state or battery state, the MPMS may continuously monitor the input voltage that is powering the LED. The MPMS may identify a drop in input voltage below a predefined threshold or identify some other predefined behavior. In some embodiments, upon identifying a voltage drop or a predefined behavior, the MPMS may enter the battery state. Otherwise, the MPSM may enter the off state. To facilitate making the determination as to enter the off state or the battery state, the MPMS may take an accurate measurement of the voltage at the input of the LED upon identifying a change in input voltage (e.g., dramatic voltage changes at the input to the LED). The MPMS may take the accurate measurement of the voltage by powering off the LEDs in order to reduce the load. The MPMS may then use the accurate measurement of the voltage to decide whether to enter the off state or the battery state, and then enter the state.

In some embodiments, once in the battery state, the MPMS may reduce the intensity level of the LED of the light fixture. For example, the MPMS may determine that the light fixture must operate a minimum number of hours (e.g., a minimum of two hours to meet a code, regulation, statute, administrative regulations, contractual obligation, or customer expectations). The MPMS may obtain information about the light fixture, environmental conditions, and battery state to calculate a fixed intensity level that will guarantee the minimum two hour run time. For example, the MPMS may obtain the ambient temperature and time since last full charge of the battery and calculate the intensity level based on the size of the battery. The MPMS may be preconfigured to have information about the size of the battery instead of obtain the information in real-time since the size of the battery may not change during operation.

Since the ambient temperature may affect battery's capacity (e.g., the amount of electric charge the battery can store), the MPMS may include a temperature sensor configured to take periodic temperature measurements. The MPMS may determine the ambient temperature by logging and averaging the periodic temperature measurements to determine the ambient temperature. In some embodiments, the MPMS may determine the ambient temperature by measuring the temperature when the light fixture is in an off state. In some embodiments, the MPMS may determine the ambient temperature by measuring the temperature when the light fixture is in the on state and subtracting the self-heating of the fixture to calculate the ambient temperature. For example, the MPMS may obtain information about the amount of heat an LED generates at an intensity level.

In some embodiments, the MPMS may calculate an intensity level for the light fixture based on historical charging and discharging information. For example, the MPMS may enter a battery state, during which the battery may discharge for a period, exit the battery state (upon return of power from the first power supply), and then reenter battery state (e.g., upon loss of power from the first power supply). Further to this example, the MPMS may make a determination based on the anticipated charge rate and time the battery was charged. The MPMS may identify an intensity level in an attempt to maximize run time while not dropping below a predefined intensity threshold (e.g., based on minimum light level code requirements).

In some embodiments, the MPMS may facilitate active thermal management to protect the LEDs, power supply, and/or battery from excessive heat. For example, under normal operation (e.g., lighting fixture power by first power supply) the MPMS may identify that the LED fixture is operating at a high ambient temperature and lower the intensity level of the LED to reduce the amount of power being used by the LED. In some embodiments, the MPMS may determine that the first power supply may overheat and further reduce power usage. In some embodiments, the MPMS may be effectively load-shedding the first power supply.

In some embodiments, the MPMS may prevent the battery from deep discharging in order to preserver the long term health of the battery. For example, the MPMS may obtain information about the input voltage, run time, and ambient temperature to make a decision as to when to shut down the lighting fixture to preserve the battery.

In some embodiments, the light fixture may include a processor that manages the light, the health of the remote battery system, and determines when to enter the battery state, off state or on state. Since the lighting fixture includes the processor, the battery box may be a simple and cost effective design that includes a battery charged by the second power supply coupled with a resistor, without the use of printed circuit boards or other components. The MPMS may not require extra control wires or wireless devices because all of the necessary information may be obtained from the input voltage to the LED fixture, which is able to identify whether the light fixture is operating off of the first power supply, the battery and the second power supply, or only the battery.

In some embodiments, the MPMS of the light fixture can optimize the lifetime of the battery and first power supply by preventing the battery from deep discharging and preventing the first power supply from overheating. In some embodiments, the MPMS of the light fixture may be coupled with other light fixtures to create a network of intelligent lights that are connected to a DC battery system. The network of intelligent lights (e.g., light fixtures that include the MPMS) may make decisions based on the health and/or state of the one or more batteries. In some embodiments, the network of intelligent lights may be facilitate solar and/or off grid applications.

In some aspects, the present invention is directed to a system for providing multi-state power management. In some embodiments, the system includes a first power supply having a first input connected to a switched alternating current ("AC") line. The first power supply also includes a first output connected via a first diode to a voltage input of a device. The first power supply outputs a first predetermined level of direct current ("DC") voltage. The system also includes a second power supply having a second input connected to an AC line. The second power supply also includes a second output connected via a second diode to the voltage input of the device. The second diode is connected in parallel to the first diode. The second power supply outputs a second predetermined level of DC voltage. The system also includes a battery connected in parallel to the second power supply. The battery can be connected via the second diode to the voltage input of the device, and be configured to output a third predetermined level of DC voltage. If the switched AC line is off, then the first and second diode switch the power provided to the device to the second predetermined level of DC voltage provided by the second power supply. If the AC line is off, the second diode switches the power provided to the device to the third predetermined level of DC voltage provided by the battery.

In some embodiments, the first predetermined level of DC voltage provided by the first power supply is greater than the second predetermined level of DC voltage provided by the second power supply. In some embodiments, the second predetermined level of DC voltage provided by the second power supply is greater than the third predetermined level of DC voltage provided by the battery.

In some embodiments, the device includes a controller for controlling one or more light sources. In some embodiments, the device comprises a light emitting diode (LED) light fixture.

In some embodiments, the device is configured to operate with voltage inputs from at least a range between the third predetermined level of DC voltage and the first predetermined level of DC voltage.

In some embodiments, outputs of the first diode and the second diode are connected to a driver for the device.

In some embodiments, when the switched AC line is off and the AC line is on, the second power supply provides the second predetermined level of DC voltage to the device. In this embodiment, the second power supply provides power at the second predetermined level of DC voltage instead of the first power supply providing power at the first predetermined level of DC voltage and the battery providing power at the third predetermined level of DC voltage.

In some embodiments, when the AC line is off and the switched AC line is off, the battery provides the third predetermined level of DC voltage to the device. In this embodiment, the battery provides the third predetermined level of DC voltage instead of the first predetermined level of DC voltage of the first power supply and the second predetermined level of DC voltage of the second power supply In some embodiments, when the switched AC line is on, the first and second diodes switch the power to the device to the first predetermined level of DC voltage provided by the first power supply.

Some aspects of the present invention are directed to a lighting system having a switching device for multi-state power management. In some embodiments, the lighting system includes a lighting fixture that includes one or more inputs. One of the inputs can includes a voltage input. The switching device can be coupled between the lighting fixture and multiple AC lines. The switching device can also include one or more outputs. One of the outputs is connected to the voltage input of the lighting fixture. The switching device also switches power outputted by the switching device to the lighting fixture. The switching devices switches power between one of a switched AC line of the multiple AC lines, a continuous AC line of the multiple AC lines and a battery.

In some embodiments, the switching device includes a first power supply connected to the switched AC line. The first power supply is also connected to the output of the switching device via a first diode. The first power supply is configured to output a first predetermined level of DC voltage. A second power supply is connected to the continuous AC line and connected to the output via a second diode. The second diode is connected in parallel to the first diode. The second power supply is configured to output a second predetermined level of DC voltage. The lighting system also includes a battery connected in parallel to the second power supply. The battery is connected to the output via the second diode. The battery is configured to output a third predetermined level of DC voltage. When the switched AC line is off, the switching device switches the power provided to the lighting fixture. The switching device switches the power to the second predetermined level of DC voltage provided by the second power supply. When the continuous AC line is off, the switching device switches the power delivered to the lighting fixture to the third predetermined level of DC voltage provided by the battery.

In some embodiments, the first predetermined level of DC voltage provided by the first power supply is greater than the second predetermined level of DC voltage provided by the second power supply. In some embodiments, the second predetermined level of DC voltage provided by the second power supply is greater than the third predetermined level of DC voltage provided by the battery.

In some embodiments, the lighting device includes a driver connected to the voltage input. The driver controls one or more light emitting diodes (LEDs) of the light fixture. In some embodiments, the first and second diodes of the switching device switches the power delivered to the lighting fixture. The switching device can switch the power between one of the switched AC line, the continuous AC line and the battery.

In some embodiments, the lighting fixture is configured to operate with voltage inputs from at least a range between the third predetermined level of DC voltage and the first predetermined level of DC voltage.

In some embodiments, outputs of the first diode and the second diode are connected to the output of the switching device.

In some embodiments, when the switched AC line is off and the continuous AC line is on, the second power supply provides the second predetermined level of DC voltage to the device. The second predetermined level of DC voltage is provided by the second power supply instead of the first power supply providing power at the first predetermined level of DC voltage and the battery providing power at the third predetermined level of DC voltage.

In some embodiments, when the continuous AC line is off and the switched AC line is off, the battery provides the third predetermined level of DC voltage to the device. The third predetermined level of DC voltage is provided by the battery instead of the first predetermined level of DC voltage of the first power supply and the second predetermined level of DC voltage of the second power supply.

In some embodiments, when the switched AC line is on, the switching device switches the power outputted to the device. The switching device switches the outputted power to the first predetermined level of DC voltage provided by the first power supply.

Some aspects of the present invention are directed to a lighting fixture configured to manage power use. In some embodiments, the lighting fixture includes one or more lighting elements. The lighting fixture may also include one or more inputs, an input of the one or more inputs comprising a voltage input coupled to a battery. The lighting fixture may include a processor that controls the one or more lighting elements. The processor may be configured to determine changes to a battery status based on differences in voltage at the voltage input. Based on the battery status, the battery may control an intensity level of the one or more lighting elements.

The battery status may include at least one of charged, charging, trickle charging, discharging, deep discharged, and percentage charge remaining. In some embodiments, the processor may reduce the intensity level response to a determination that the battery status is discharging.

In some embodiments, the lighting fixture includes a temperature sensor. The processor may be further configured obtain and ambient temperature via the temperature sensor. Based on the ambient temperature and the battery status, the processor may control the intensity level of the one or more lighting elements. In some embodiments, the processor may reduce the intensity level upon determining that the ambient temperature is above a first temperature threshold and the battery status is discharging. In some embodiments, the processor may reduce the intensity level upon determining that the ambient temperature is below a second temperature threshold and the battery status is discharging.

In some embodiments, the lighting fixture is further configured to obtain a minimum run time of the one or more lighting elements. Based on the battery status and the ambient temperature, the lighting fixture may select an intensity level that provides the minimum run time without resulting in a deep discharge battery status.

In some embodiments, the voltage input of the lighting fixture may be coupled to a first power supply. The voltage input of the lighting fixture may also be coupled a second power supply and/or to the battery. The second power supply may be coupled to the battery and configured to charge the battery.

In some embodiments, the lighting fixture determines that the first power supply and second power supply have been turned off. The lighting fixture may make this determination based on differences in voltage at the voltage input. Response to the first power supply and second power supply being turned off, the lighting fixture may enter a battery state. The lighting fixture may reduce the intensity level responsive to entering the battery state. The lighting fixture may select the intensity level based, at least in part, on a minimum run time of the one or more lighting elements.

In some embodiments, the lighting fixture may determine that the first power supply has been turned off and the second power supply is on. the lighting fixture may make this determination based on the differences in voltage at the voltage input. Responsive to the first power supply being turned off and the second power supply being on, the lighting fixture may enter an off state.

In some embodiments, the lighting fixture includes a temperature sensor. The lighting fixture may determine, via the temperature sensor, that a temperature of the first power supply is above a power supply temperature threshold. Based on the temperature, the lighting fixture may reduce the intensity level of the one or more lighting elements.

In some embodiments, the lighting fixture includes a memory. The lighting fixture may log into the memory an electronic record. The electronic record may include a plurality of voltage measurements at the voltage input. Based on the electronic record, the lighting fixture may determine at least one of a maximum voltage, a minimum voltage, and an average voltage.

BRIEF DESCRIPTION OF THE DRAWINGS

The foregoing and other objects, aspects, features, and advantages of the present invention will become more apparent and better understood by referring to the following description taken in conjunction with the accompanying drawings, in which.

The features and advantages of the present invention will become more apparent from the detailed description set forth below when taken in conjunction with the drawings, in which like reference characters identify corresponding elements throughout.

DETAILED DESCRIPTION

Figure 1:
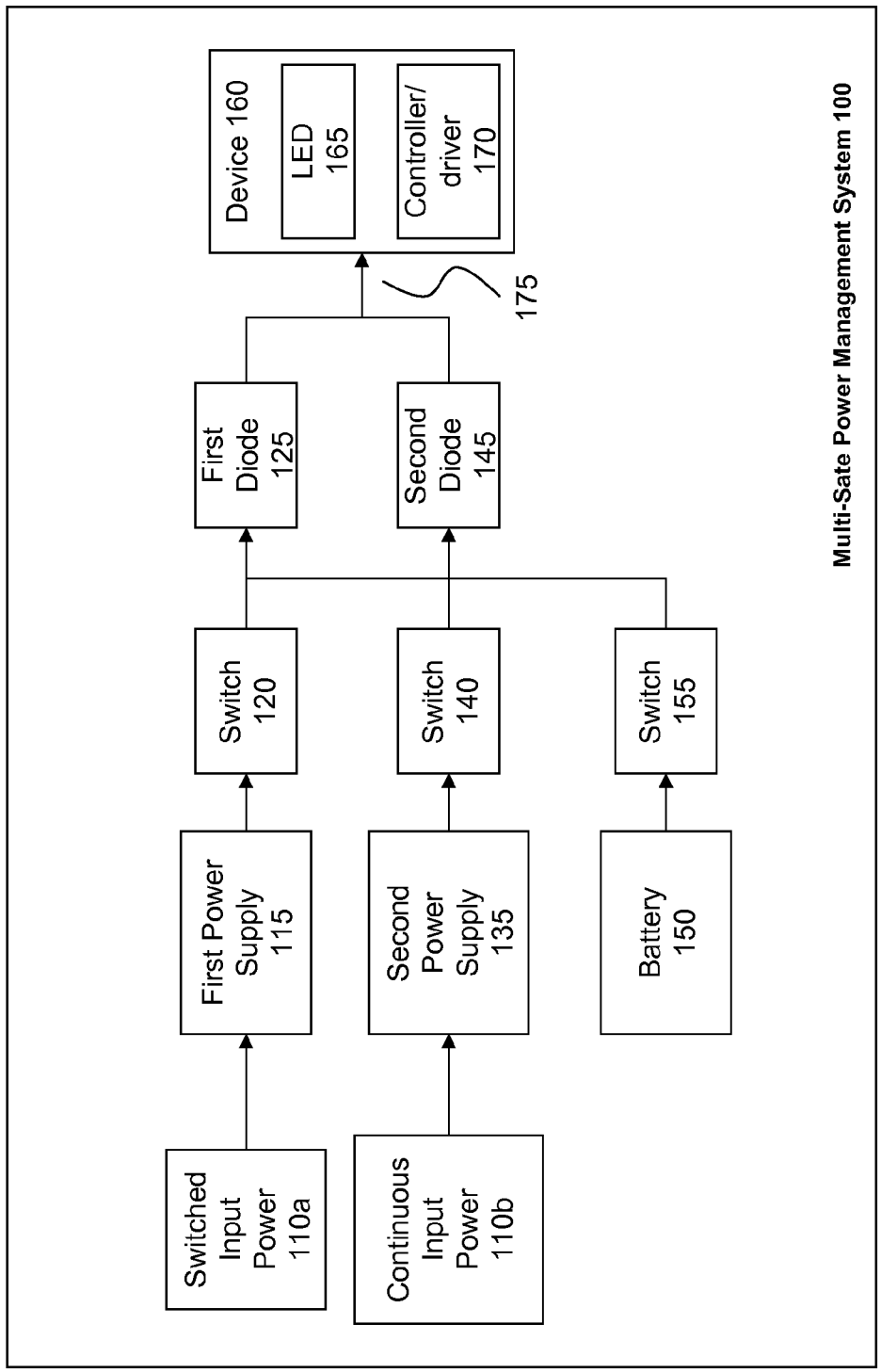
FIG. 1 is a block diagram that depicts an embodiment of a system for providing multi-state power management.

Apparatus, systems and methods of the present invention provide multi-state power management. In some examples, the present invention may be configured to include one light source (e.g., LED) per battery and first power supply. In some examples, the present invention is configured to include a plurality of light sources per battery and first power supply. The present invention may facilitate multi-state power management in various deployments and applications. In an illustrative example, remote sites such as a windmill tower may be required (e.g., by a code, regulation, statute, contractual obligation, safety requirements, warranty, etc.) to provide a minimum number of hours of lighting upon power loss. The lighting fixtures of remote sites may include battery backup power to provide lighting in the event of a power loss. To facilitate maximizing the duration of lighting, to meet minimum requirements, and/or maintain the health and longevity of the system, apparatus, systems and methods of the present disclosure provide multi-state power management.

In some embodiments, the multi-state power management system ("MPMS") monitors voltage at a voltage input to provide power management functionality. Based on voltage readings and/or changes in voltage readings at the voltage input, the MPMS can identify a battery state or obtain an indication to enter an off state, emergency backup state, or an on state. The MPMS may control a device to reduce power usage (e.g., turn a light source off to enter an off state), turn the device on, reduce the intensity of a light source (e.g., to reduce power consumption), charge the battery, and/or trickle charge the battery. In some embodiments, the MPMS may further include a temperature sensor to facilitate making one or more decision regarding the one or more lights and/or battery.

For example, the MPMS may monitor the voltage at a single voltage input of a device (e.g., lighting fixture, light emitting diodes, computing device) that also powers the device. Based on voltage readings and/or variances in voltage readings at the single voltage input, the MPMS can identify a battery state, an indication to enter an off state, emergency backup state and/or on state. For example, the voltage input may be coupled to a plurality of power sources. Each power source may output power at a different voltage level. For example, a first power supply may output voltage at the highest level, e.g., 28V; the second power supply may provide output voltage at 14V; and a battery may provide output voltage at 12V. In some embodiments, the MPMS may identify the power source as the first power supply by identifying the voltage at the single voltage input of the device as 28V (or identifying that the voltage is not 12V or 14V). In some embodiments, the MPMS may identify the battery as the power source by identifying the voltage at the single voltage input to be 12V.

In some embodiments, the MPMS may provide multi-state power management based on variances in voltage at the single voltage input and information about the battery (e.g., the rated output voltage of the battery or battery voltage vs. discharge time information). For example, the MPMS may identify that the battery is discharging based on the battery voltage. The MPMS may further identify, based on the amount of time the battery has been charging, the remaining battery capacity. The MPMS may use the remaining battery capacity information to control power use of the device such that the device may run on battery power for a minimum amount of time. Thus, in some embodiments, the present disclosure provides for multi-state power management by monitoring the variances in voltage at a single voltage input of a device that also powers the device.

Referring to FIG. 1, is a block diagram that depicts an embodiment of a system for providing multi-state power management. In brief overview, the MPMS 100 may include an input power 110a that supplies power to a first power supply 115. The input power 110a may include an alternating current ("AC") line that is coupled to the first power supply 115 via a switch. In some embodiments, the first power supply 115 may be coupled to a switch 120. In some embodiments, the first power supply 115 may be coupled to the first diode 125. In other embodiments, the first power supply 115 may be coupled to the first diode 125 via switch 120. The first diode 125 may be coupled to device 160, such as, e.g., a light fixture. The device 160 may include an LED 165 that provides light. The device 160 may include a controller and/or driver 170 that may control an aspect of the LED 165 including, e.g., the intensity level of the LED. The controller and/or driver 170 can interface between a software application of the device 160 and a hardware module of the device 160 or system 100. Under some operational conditions, in some embodiments, the device 160 may receive power from input power 110a via first power supply 115, switch 120, and first diode 125. In some embodiments, the MPMS 100 includes an input power 110b coupled to a second power supply 135. The input power 110b may include a continuous AC line. The second power supply 135 may be coupled to a battery 150 via switch 140 and switch 155. The second power supply 135 may also be coupled to a second diode 145 via switch 140. The second diode 145 may be coupled to device 160. Under certain operational conditions, in some embodiments, the input power 110b may provide power to battery 150 to charge battery 150. The input power 110b may be provided to battery 150 via second power supply 135, switch 140 and switch 155. In some embodiments, if input power 110a and input power 110b are lost (e.g., due to a power outage), the battery 150 may provide power to device 160. In some embodiments, the second diode 125 may be connected to device 160 in parallel to the first diode 125. The battery may be connected to device 160 via second diode 145 in parallel to the second power supply 135.

In further detail, input power 110a and/or input power 110b may include alternating current electric power (e.g., mains power). In some embodiments, the voltage of the input power 110a-b may comprise 120V or 240V AC with a frequency of 50 or 60 Hz. The current of the input power 110a-b may comprise 220 milli Amps ("mA") or 110 mA. In some embodiments, the voltage of input power 110a-b may be 120V and the current may be 220 mA. In some embodiments, the input power 110a-b may have a voltage of 240V and a current of 110 mA. In some embodiments, the voltage, current, and/or frequency of input power 110a may be different from the voltage, current and/or frequency of input power 110b.

In some embodiments, the input power 110a may provide 220 mA or 110 mA to each device 160 or LED light 165. The input power 110a may be coupled to an inline switch to break the flow of electricity to the first power supply 115 and/or to turn the device 160 on/off.

The input power 110a may be directly coupled to the first power supply 115 or coupled to the first power supply 115 via intermediate devices and/or components such as, e.g., electronic components (e.g., resistors, capacitors, inductors, switches), active components, passive components, wires, etc. The first power supply 115 may be any device that supplies electric power to an electric load such as, e.g., a Mean Well™ brand power supply. In some embodiments, the first power supply 115 may control the output voltage or current to a specific value; e.g., the controlled value may be held substantially constant despite variations in either load current or the voltage supplied by the power supply's energy source.

The first power supply 115 may convert one form of energy to another. For example, the first power supply 115 may convert AC line voltage from a transmission system to DC voltage. In some embodiments, the first power supply 115 may receive 120V or 240V AC line voltage and convert the electrical energy to a first predetermined voltage level (e.g., 24V, 28V, or another suitable predetermined voltage to power device 160).

In some embodiments, the first power supply 115 may convert the AC line voltage to a voltage level that is not predetermined. The output voltage level may be a voltage level that facilitates powering the device 160. In some embodiments, the voltage level output of first power supply 115 may be different from the voltage level output of the second power supply 135 and/or the battery 150. In some embodiments, the DC voltage provided by first power supply 115 may be higher than the DC voltage provided by second power supply 135 and/or DC output voltage provided by battery 150. In some embodiments, the DC output voltage provided by the first power supply 115 may be higher than the voltage provided by the second power supply 135 and the output voltage of the second power supply 135 may be higher than the output voltage provided by batter 150. For example, the device 160 may be configured to determine the power source (e.g., first power supply 115, second power supply 135, or battery 135) based on the voltage level. For example, if the device 160 identifies the voltage at the input voltage of device 160 to be 28V, the device 160 may determine that the first power supply 115 is powering device 160.

In some embodiments, the MPMS 100 may include one or more switches 120, 140 and 155. The switch 120 may be coupled to the first power supply 115 and the first diode 125. Switch 140 may be coupled to second power supply 135 and second diode 145. Switch 155 may be coupled to battery 150 and the first diode 125 and/or second diode 145. Switches 120, 140 and 155 may break an electric circuit or provide for the flow of electricity. For example, switch 120 may break the electric circuit between first power supply 115 and first diode 125. For example, a user of the system 100 may turn off the device 160 by breaking the electric circuit between input power 110 and the device 160 by "opening" switch 120. A user may turn on the device 160 by "closing" switch 120 so electricity can flow between input power 110 and device 160. In some embodiments, the system 100 may include switch 120 for testing purposes and may not require switch 120 for operational use.

The switch 120 may comprise any components that facilitate the flow of electricity and the provide the ability to break the flow of electricity, including, e.g., manual switches, toggle switches, electronic switches, relays, MOSFET transistors, logic gates, etc. For example, switch 120 may be a manual switch such as a manually operated electromechanical device with one or more sets of electrical contacts, which are connected to external circuits. Each set of contacts can be in one of two states: either "closed" meaning the contacts are touching and electricity can flow between them, or "open", meaning the contacts are separated and the switch is nonconducting. In some embodiments, the switch 120 may be an automatic switch controlled by system 100 and/or device 160. For example, the device 160 may alter the state of switch 120 in response to an event or condition (e.g., temperature or battery state).

Switch 120 may be operated by process variables such as pressure, temperature, flow, current, voltage, and force, acting as sensors in a process and used to automatically control a system. In some embodiments, switch 120 may be a relay, e.g., a switch operated by another electrical circuit.

In some embodiments, system 100 includes one or more first diode 125 and second diode 145. The first diode 125 may be coupled to switch 120 and device 160. Second diode 145 may be coupled to switch 145, switch 155, and device 160. In some embodiments, first diode 125 may be coupled to first power supply 115. In some embodiments, second diode 145 may be coupled to second power supply 135 and/or battery 150. In some embodiments, first and second diodes 125 and 145 may be connected to controller/driver 170 of device 160.

The first and second diodes 125 and 145 may allow an electric current to pass in one direction (e.g., from input power 110 to device 160), while blocking current in the opposite/reverse direction (e.g., from device 160 and/or the output of second diode 145 to first power supply 115). First and second diodes 125 and 145 may include any components to provide the described asymmetric transfer characteristic, with low resistance to current flow in one direction, and high resistance in the other direction. For example, diodes 125 and 145 may include a semiconductor diode with a crystalline piece of semiconductor material with a p-n junction connected to two electrical terminals. Diodes 125 and 145 may be configured to begin conducting electricity when a certain threshold voltage or cut-in voltage is present in the forward direction (e.g., 12V to 30V). First diode 125 may have a first threshold voltage and second diode 145 may have a second threshold voltage, wherein the first and second threshold voltages are the same or different.

In one embodiment, when the switched AC line of input power 110a is on, the first and second diodes may switch the power to device 160 to a first predetermined level of DC voltage provided by the first power supply (e.g., 24V, 28V or a voltage between 20V and 30V or another voltage with which device 160 is configured to operate).

In some embodiments, system 100 includes a second power supply 135 coupled to input power 110b. Input power 110b may be the same as input power 110a. Input power 110b may be coupled to the second power supply 135 and may provide a continuous AC line. In some embodiments, the second power supply 135 may be configured to charge battery 150. The second power supply 135 may provide different levels of power to battery 150 based on the battery state. For example, if battery 150 has a low charge, then second power supply 135 may fast charge battery 150 by providing increased amounts of power. If battery 150 is fully charged, the second power supply 135 may provide no power or trickle charge battery 150. The second power supply 135 may vary the amount of charging or power throughout a charge cycle based on battery state.

In some embodiments, upon the switched AC line 110a being off and the continuous AC line 110b being on, the second power supply 135 provides the second predetermined level of DC voltage to device 160. The second power supply 135 may provide the second predetermined output voltage level instead of the first power supply 115 providing power at the first predetermined level of DC voltage and instead of the batter 150 providing power at a third predetermined level of DC voltage.

The second power supply 135 may also convert AC line voltage to DC voltage. In some embodiments, second power supply 135 may output a second predetermined voltage level that is different than the first predetermined voltage level being output by the first power supply 115. For example, the second predetermined voltage level may be a voltage level that facilitates charging battery 150 such as, e.g., 14V DC, or a voltage between 14V and 24V DC.

The second power supply 135 may include or be connected to a charging module configured to charge the battery 150. The charging module may include hardware/software that provides charging control functionality. For example, the charging module may control and/or monitor an aspect of the second power supply 135 and/or battery 150. In some embodiments, charging module comprises a charging FET (field effect transistor) designed and configured to perform power control tasks that may extend battery life. For example, the charging module may comprise power-saving load switches that feature low $R_{DS(ON)}$ P-channel MOSFET switch circuitry to control the output rise time.

The system 100 may include a battery 150 coupled to switch 155, switch 140, second power supply 135, second diode 145 and/or first diode 125. The battery 150 may provide power to device 160. The battery 150 may be charged by second power supply 135. In some embodiments, the battery 150 may be configured to provide power to device 160 in response to a power outage (e.g., in the event that input power 110*a-b* cannot provide power to first and second power supplies 115 and 135).

Battery 150 may be configured to provide output voltage at a level sufficient to power device 160 such as, e.g., 12V, 14V, or 16V or another voltage between a minimum voltage and a maximum voltage level for which the device 160 can operate. In some embodiments, the battery 150 may power device 160 upon the second power supply 135 losing AC power.

Battery 150 may include one or more electrochemical cells (or a battery stack that includes multiple electrochemical cells) that convert stored chemical energy into electrical energy. Battery 150 may be a rechargeable battery designed to be recharged and used multiple times. Battery 150 may include one or more cells to provide a total output voltage. For example, battery 150 may include 10 AA cells to provide 12V output voltage. Battery 150 types may include NiCd, Lead-acide, NiMH, NiZn, or Litium ion. Each cell of battery 150 may be configured to output a nominal voltage of, e.g., 1.25V 1.5V or 1.65V. Each cell of battery 150 may have a capacity between 800 to 2700 milliampere-Hours (mAh).

The battery 150 may comprise a battery status, which may be determined by a controller 170. The battery status may refer to a current state of the battery 150, historical state of the battery 150, health of the battery 150, or other information about the battery 150. Battery status may include, e.g., charged, percentage charged, charging, trickle charging, discharging, deep cycle, deep discharged, and/or percentage discharged. Charged may refer to the battery being fully charged (e.g., 100%) or substantially fully charged (e.g., above 95% charged, above 97% charged or 99% charged). Charging may refer to the battery being charged by a power supply, e.g., second power supply 135. Battery may be charging at a nominal rate, slow rate, or fast rate depending on the percent charged. For example, if the battery is at 95% charge, battery circuitry may provide a trickle charge so as to maintain the health of the battery. If the battery is at 20% charge, the system 100 may fast charge the battery 150 until it reaches a threshold charge percentage. Trickle charging may refer to charging a fully charged battery under no-load a rate equal to the battery's self-discharge rate, thus enabling the battery to remain at its fully charged level. A battery status of float-charging may refer to a battery under continuous float voltage charging.

In some embodiments, system 100 may identify when battery 150 is fully charged. For example, the controller 170 may monitor battery 150 voltage. In the case of a NiMH battery, the voltage across the battery increases slowly during the charging process, until the battery is fully charged. After that, the voltage decreases, which may indicate to system 100 (e.g., controller 170 or other battery charging circuitry or component) that the battery is fully charged.

In some embodiments, system 100 may identify the battery status as discharging based on the voltage level at the voltage input. For example, if the voltage level at the voltage input is below the first predetermined voltage level and second predetermined voltage level (e.g., of the first power supply 115 and the second power supply 135) and the device is consuming power (e.g., lighting elements of LED 165 are on), the system 100 may determine that the battery 150 is providing power to device 160, and thus currently being discharged. The system 100 may further determine a percentage discharge of the battery based on the amount of time the battery has been discharging and the current output of the battery (e.g., determined based on the intensity level of the lighting elements of LED 165 or total battery power use of device 160 and other components). In some embodiments, the system 100 may determine a percentage discharge based on a battery profile/curve that maps the voltage variation to percentage discharge or discharge time to percentage discharge. Similarly, system 100 may determine percentage charge remaining based on the previous state of battery 150 and the amount of time battery 150 is being charged. For example, if battery 150 reached deep cycle (e.g., voltage drop below cut-off voltage which may reflect 80% discharge), system 100 may determine the percentage charge of the battery based on the subsequent charge time.

In some embodiments, system 100 includes device 160 coupled to the first diode 125 and second diode 145 via wire 175. In some embodiments, the device 160 may include a light source, such as LED 165, driven or controlled by a controller and/or driver 170. In some embodiments, device 160 may comprise a lighting fixture. The device 160 may adjust power use (e.g., intensity level of LED 165) based on a battery state and/or temperature of one or more component of system 100 and/or device 160. The device 160 may include a temperature measuring component and a processor for executing instructions. Device 160 may receive power from at least one of first power supply 115, second power supply 135 and battery 150.

In further detail, device 160 may be coupled to first diode 125 and second diode 145 via wire 175. Wire 175 may include two wires, such as a positive (+) wire and a negative (−) wire. The wire may be any type of wire or cable configured to provide power to device 160. Wire 175 may be shielded such that it can withstand various environmental conditions including, e.g., water, ice, wind, debris, etc. In some embodiments, the MPMS 100 may include a plurality of devices 160 coupled via wire 175 to first diode 125 and second diode 145. For example, a plurality of devices 160 may be coupled in parallel to voltage input via wire 175.

Device 160 may include a load that consumes power or converts electrical power from one form to another. The device 160 may be configured to operate with voltage inputs from at least a range between the output voltage of the battery 150 and the higher of the output voltage of the first power supply 115 and second power supply 135. In some embodiments, device 160 includes at least one LED 165 configured to receive electrical power and to generate light in the visible spectrum. LED 165 may include one or more lighting elements. Device 160 may include a plurality of light sources and/or other types of light sources such as, e.g., an incandescent light bulb, halogen lamp, fluorescent lamp, compact fluorescent lamp.

In some embodiments, device 160 includes a controller 170 designed and configured to monitor and/or control one or more aspect or functionality of system 100. In some embodiments, the controller 170 may include a processor and/or microprocessor. The controller may include various input/output pins, access to memory, and/or one or more processing cores. In some embodiments, the controller 170 may include analog and/or digital electronic circuit components such as, e.g., comparators, operational amplifiers, resistors, capacitors, inductors, diodes, transistors, counters, etc., configured to perform one or more functionally described herein.

The controller 170 may monitor a voltage level at the input voltage of device 160. In some embodiments, the controller 170 monitors the single voltage input of the device 160 that also powers the device 160. In some embodiments, where multiple devices 160a-n are coupled, in parallel, to the same voltage input via wire 175, the controllers 170a-n may monitor the voltage input of devices 160a-n. The controller 170 may facilitate multi-state power management based on the monitored voltage at the voltage input. For example, responsive to identifying changes in voltage at the input voltage of device 160, the controller 170 may control the intensity level of one or more lighting elements of LED 165. For example, the controller 170 may identify the voltage at the input voltage drop from a first voltage level to a second voltage level (e.g., 28V of the first power supply 115 to 14V of second power supply 135). The controller 170 may determine that the voltage drop is not due to a power outage because second power supply 135 is supplying power at 14V. The controller 170 may further determine that since the voltage drop is not due to a power outage, that a user intended to cut power to device 160 (e.g., turn off the light). Accordingly, the controller 170 may lower the intensity level or turn off LED 165.

The controller 170 may be configured to identify voltage changes at the input voltage and compare the voltage to a predetermined level of DC to identify the source of power. For example, when the switched AC line (e.g., input power 110a) is on (e.g., closed switch), the voltage at the voltage input may be a first predetermined voltage (e.g., 24V or 28V). When the switched AC line (e.g., input power 110a) is off (e.g., open switch), the first diode 125 and second diode 145 may be configured to switch the power provided to the device 160 to a second predetermined level of DC voltage provided by the second power supply (e.g., 14V or 18V). The controller 170, upon identifying the second predetermined level of DC voltage, may be configured to turn off the device 160 and/or LED 165. The controller 165 may dim lighting elements of LED 165 to 0%. This scenario may represent a user intending to turn off LED 165.

Controller/driver 170 may include an LED dimmer designed and configured to vary the intensity level of one or more lighting elements of an LED 165. For example, controller 170 may comprise LiGHTLiNK™ series LL-101-04 dimmer comprising executable instructions configured to provide functionality described herein, for example by controller 170. For example, controller 170 may identify a loss in AC power and enter a battery state. The controller 170 may further dim LED 165 in response to entering the battery backup state. In some embodiments, the controller 170 may monitor temperature via a temperature sensor and dim LED 165 in response to an increase in temperature. For example, the controller 170 may access information from a temperature sensor and/or include a temperature sensor. In some embodiments, a temperature sensor may include, e.g., a silicon thermostat. In some embodiments, the temperature sensor may include a digital thermometer. Power may be provide to controller 170 via wire 175.

In a power outage scenario, both the switched AC line 110a and continuous AC line input power 110b may lose power. The second diode 145 may be configured to switch the power provided to the device 160 to a third predetermined level of DC voltage (e.g., 12V or 10V) provided by the battery 150. The controller 170, identifying the third predetermined level of DC voltage provided by the battery, may control the intensity of lighting elements of LED 165 in order to meet a minimum required run time. In some embodiments, the controller 170 may comprise a memory or computer-readable storage medium comprising information about the charge capacity of battery 150, a battery profile indicating the variation in voltage to discharge time, battery characteristics, LED power requirements, minimum required run times based on codes, regulations, statutes, contractual agreements, etc. Using the stored information and other information sensed about the environment (e.g., measured voltage of the battery and/or temperature), the controller 170 may control the intensity level of the lighting elements. The controller 170 may compute an intensity level using the following equation: $I=(C/T)^{\wedge}(1/n)$, where I is the rate of discharge or current flow in Amperes, C is the capacity of the battery in Ampere-hours, T is the time in hours, and n is the Peukret number for the battery, which indicates how well the battery performs under heavy rates of discharge and typically ranges from 1.1 to 1.4. In some embodiments, the controller 170 may use a predetermined value for the capacity of the battery (e.g., 2500 mAH) and the Peukret number (e.g., 1.2) and the time (e.g., 4 hours), which may provide a discharge rate of 0.67 Amps over four hours. The controller 170 may reduce the intensity of the lighting elements accordingly, e.g., by dimming the lighting elements such that the power use over the 4 hour time period corresponds to the charge capacity of the battery. In some embodiments, the controller 170 may determine an intensity level for the LED to meet a minimum required run time without entering a battery deep discharge. Battery deep discharge (or deep cycle) may be defined as a cycle in which the discharge is continue until the battery reaches its cut-off voltage (e.g., 80% of discharge or a percentage between 70% to 95% of discharge depending on the battery and/or type of battery).

In some embodiments, where multiple devices 160a-n are coupled to a single battery 150, the controllers 170a-n may reduce the intensity level in accordance with the power use of one or more devices 160a-n. For example, the devices 160a-n may be configured with information about the multiple devices 160a-n including, e.g., the number of devices 160a-n coupled to the single battery 150. A single device 160 may factor the number of devices 160a-n coupled to the single battery 150 when determining how much to reduce the intensity level of the light source 165 in order to manage power use. For example, if there is one device 160 connected to battery 150, the device 160 may reduce the intensity level to 50% when in battery state. If there are 5 devices 160 connected to battery 150, the device 160 may reduce the intensity level to 10% when in battery state to achieve the same duration of power use from the single battery 150.

In some embodiments, controller 170 may be configured to reduce/increase the intensity level of the LED 165 lighting elements based on the ambient temperature. System 100 may comprise one or more temperature sensors configured to sense the ambient temperature or the temperature of one or more components of system 100. The ambient temperature may refer to the temperature of the environment (e.g., room temperature) or the temperature of system 100 when one or more components are turned off (e.g., when LED 165 is turned off or on or more other heat producing components are turned off). The one or more temperature sensors may be proximate to the first power supply 115, second power supply 135, battery 150, device 160, LED 165, and/or controller 170. Temperature sensor may be communicatively coupled to controller 170.

In some embodiments, the controller 170 may turn off one or more components to determine an ambient temperature. For example, upon the switched AC line 110a and continuous AC line 110b being turned off, the first and second power supplies 115 and 135 may subsequently turn off. Upon identifying that the voltage level at the voltage input corresponds to the voltage level of the battery 150 (which may be lower than the first and second predetermined output voltage levels of the first and second power supplies 115 and 135, respectively), the controller 170 may facilitate taking an ambient temperature measurement. For example, instead of turning on LED 165, the controller may leave LED 165 turned off so that no additional heat is dissipated. As system 100 may be using minimal power, and thus generating minimal heat, when there is a power outage and the LED 165 are turned off, this temperature measurement may reflect the ambient temperature. Based on the ambient temperature and a battery status and/or a stored battery profile/curve reflecting battery characteristics based on temperature, the controller 170 may control the intensity level of lighting elements of LED 165 so as not to damage the lighting elements, battery 150 and/or a component of system 100.

For example, if the ambient temperature is above a first temperature threshold and the battery status comprises discharging, the controller 170 may reduce the intensity level of the lighting elements of LED 165. The first temperature threshold may be predetermined and stored in a computer readable storage medium accessible to controller 170. The first temperature threshold may be a temperature between 40 degrees Celsius and 55 degrees Celsius, for example.

In some embodiments, the controller may reduce the intensity level upon determining that the ambient temperature is below a second temperature threshold and the battery status comprises discharging. For example, the battery performance may degrade when the ambient temperature is low, e.g., below the second temperature threshold (e.g., below 0 degrees Celsius, below −10 degrees Celsius, below −20 degrees Celsius, etc.).

In some embodiments, the system 100 may reduce the intensity level of lighting elements of LED 165 in the on state (e.g., when switched AC line 110a is on). For example, system 100 may reduce the intensity level if the temperature of first power supply 115 is above a power supply temperature threshold in order to maintain the health of the first power supply 115 and prevent damage, fires, or other unintended consequences due to excessive heat. The system 100 may reduce the intensity level in order to consume less power, thus requiring less power from the first power supply 115 and generating less heat. The power supply temperature threshold may comprise a temperature based on the type and characteristics of the power supply and may range from 40 degrees Celsius to 70 degrees Celsius.

In some embodiments, the system 100 may control the intensity level of the lighting elements based on the duration of time the temperature (e.g., ambient or of a component) exceeds a temperature threshold. For example, the system may reduce the intensity level if the temperature of the first power supply 115 is above a power supply temperature threshold for longer than a time threshold (e.g., 1 minute, 5 minutes, 10 minutes, 30 minutes, 1 hour, etc. or any other time based on the temperature characteristics of system 100 and/or power supply).

The controller 170 may be attached to a lighting device 160, comprised within a lighting device 160 or be external to the lighting device 160. The controller may comprise hardware, software or a combination of hardware (e.g., a processor, memory, cache, and/or input/output devices) and software for monitoring lighting device temperature and adjusting brightness or intensity of the lighting device responsive to the temperature. The device 160 may comprise memory and storage for storing information, processor, processing units and logic units, logical circuitry as well as analog and digital circuitry for implementing any functionality described herein. For example, the controller 170 may include any logic circuitry that responds to and processes instructions fetched from a memory unit. The device 160 may comprise functionality to monitor input voltage and may include, e.g., a voltmeter and/or a digital multimeter.

In some embodiments, the controller 170 may log various information to facilitate multi-state power management. The controller 170 may log an electronic record comprising one or more voltage measurements at the voltage input. The controller 170 may use one or more logged voltage measurement to facilitate determining whether device 160 is being powered by the switched AC line 110a via first power supply 115, continuous input power 110b via second power supply 135 or battery 150. In some embodiments, the controller 170 may further determine the health and/or status of the battery 150 or other component based on historic voltage measurements. For example, the controller 170 may determine, based on historical logged voltage measurements, a maximum voltage, minimum voltage, and an average voltage at the voltage input. The controller 170 may further identify that the maximum voltage corresponds to the output voltage level of the first power supply 115 and the minimum voltage corresponds to the output voltage of battery 150.

In some embodiments, the multi-state power management system comprises a lighting system having a switching device. The lighting system may include a lighting fixture (e.g., device 160 or LED 165). The lighting fixture may include one or more inputs, such as, e.g., a voltage input, a ground, and/or a common. The lighting system may include a switching device to provides the functionality provided by first power supply 115, second power supply 135, battery 150, first diode 125, and second diode 145. In some embodiments, the switching device comprises at least one of first power supply 115, second power supply 135, battery 150, first diode 125, and second diode 145. The switching device may be coupled between the lighting fixture (e.g., device 160) and a plurality of AC lines (e.g., switched AC line 110a and continuous AC line 110b). An output of the switching device may be connected to an input of the lighting fixture to, e.g., provide power to the lighting fixture. The switching device may be configured to switch the power used to provide power to lighting fixture. For example, the switching device may switch between the switched AC line 110a, continuous AC line 110b, and/or battery 150. The switching device may switch to the battery 150 upon losing power from AC lines 110a and 110b. The controller of the lighting device 160 may control the intensity level based on the voltage level output by the switching device and/or temperature.

Figure 2:
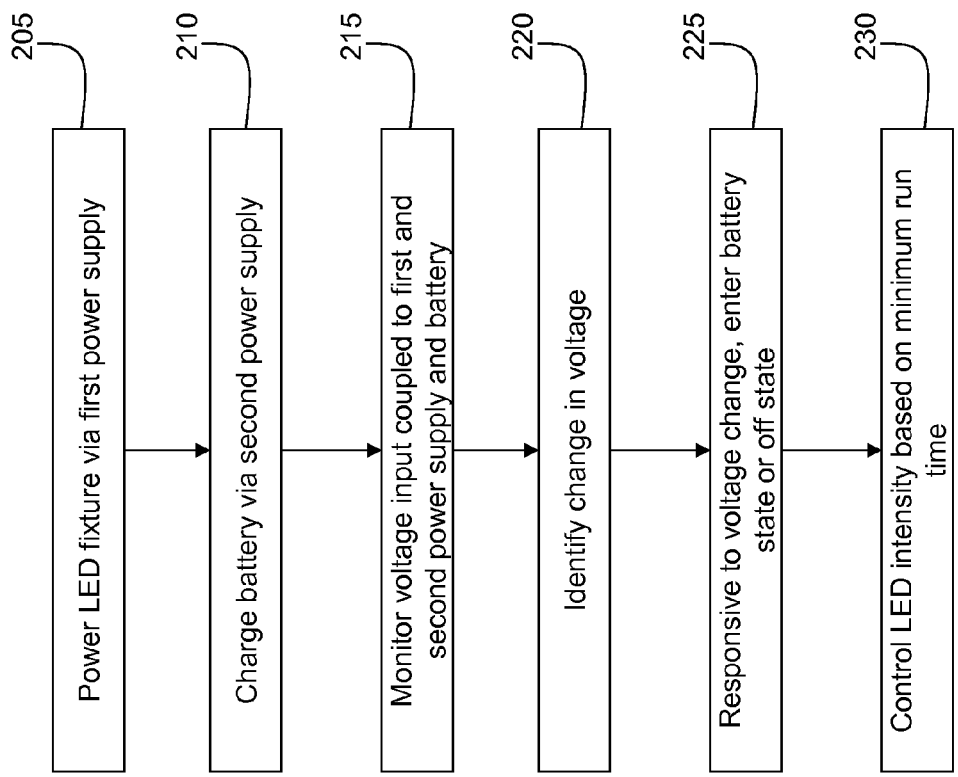
FIG. 2 is a flow chart illustrating steps of a method for multi-state power management.

Referring to FIG. 2, a flow chart illustrating steps of a method for multi-state power management is shown. In brief overview, at step 205 a first power supply provides power to an LED fixture. At step 210, a second power supply charges (e.g., fast charge, regular charge, or trickle charge) a battery. At step 215, the device monitors voltage at a voltage input. The voltage input may be coupled to at least one of the first power supply, second power supply and battery. At step 220, the device identifies a change in voltage at the voltage input. Responsive to the change in voltage, at step 225 the device determines whether to enter a battery state or an off state. At step 230, the device controls the intensity level of an light source (e.g., LED) based on a minimum desired run time for the light source.

In further detail, a first power supply powers an LED fixture at step 205. The first power supply may provide a voltage output level sufficient to power a light source, such as 24V DC, 26V DC, 28V DC. The first power supply may receive power from a switched AC line. The AC line may be referred to as switched because it is coupled to a switch such that when the switch is "closed", electricity can flow from the input power to the first power supply, and when the switch is "open", the electric circuit is broken such that electricity cannot flow from input power to the first power supply.

At step 210, a second power supply charges a battery by providing the battery with electricity. In some embodiments, the second power supply may be coupled to a continuous AC line input power. The AC line may be referred to as continuous because the second power supply is directly coupled to the AC line without an intervening switch (or if there are any intervening components, they components allow the flow of electricity under normal operating conditions). In some embodiments, the second power supply may continuously charge the battery. The second power supply may provide various amounts charging based on the battery state. For example, if the battery is at capacity, then the second power supply may merely provide a trickle charge. If the battery is almost at deep discharge, on the other hand, the second power supply may provide a maximum amount of charging (e.g., a fast charge). In some embodiments, the second power supply may be designed and constructed to provide various levels of charging based on battery state, temperature, or other conditions. In some embodiments, the second power supply may be configured to provide two charging states (e.g., charging and trickle charging)

In some embodiments, at step 215, the device monitors the voltage input coupled to the first power supply, second power supply and battery. The device may continuously monitor the voltage, periodically monitor the voltage (e.g., every millisecond, second, 5 seconds, 30 seconds, or minute), or monitor the voltage in response to the occurrence of an event or an instruction from a component (e.g., a temperature event). The device may monitor the voltage at the voltage input using a voltmeter. In some embodiments, the device may further store or log the voltage readings in an electronic record stored on the device In some embodiments, at step 215, the device may further monitor a temperature. The device may include at least one temperature sensor to monitor the temperature of at least one of a first power supply, second power supply, battery, and light fixture. In some embodiments, at least one of the first power supply, second power supply, battery and light fixture may comprise its own temperature sensor. In one embodiment, the device may include one temperature sensor. In some embodiments, at step 215, the device may monitor an ambient temperature or otherwise determine an ambient temperature. For example, the device may turn off one or more component that consumes power and generates heat in order to measure the ambient temperature. In another embodiment, the device may account for the heat generated by a component (e.g., LED or power supply) by subtracting the estimated amount of heat produced by those elements.

At step 220, the device identifies a change in voltage at the voltage input. The voltage input of the device may be coupled to the light fixture, the first power supply, the second power supply and the battery. In some embodiments, the voltage input may be coupled to the first power supply, second power supply and battery via one or more diodes and/or one or more switches. The device may identify the change in voltage using any component configured to measure a voltage change including, e.g., a voltmeter. In some embodiments, the device may be configured to measure a change in voltage and not measure an absolute voltage. In some embodiments, the device may measure voltages and compare one or more previous voltage measurement to a current voltage measurement to identify a change in voltage. In some embodiments, the device may identify a voltage change if the voltage level changes beyond a threshold level. For example, a threshold voltage may include 0.5V, 1V, 1.5V, 2V, 3V, etc. In some embodiments, the device may identify a voltage change if the voltages above a threshold within a predetermined amount of time. For example, if the voltage changes more than 0.5V within 5 seconds, the device may identify the event as a change in voltage. The predetermined time period may be any suitable time period that indicates that a change in voltage is significant, such as, e.g., 1 second, 2 seconds, 5 seconds, 10 seconds, 30 seconds, 1 minute, or another time period In some embodiments, at step 220, the device may provide multi-state power management based on one or more changes in voltage or rates of change in voltage at the voltage input. Depending on the rate of change of voltage, the device may determine to conserve battery power by reducing power use of the device, increase power use, or stop power use. For example, if the voltage changes significantly in a short period of time (e.g., from a first predetermined voltage output to a second or third predetermined voltage output in less than a predetermined amount of time), the MPMS may determine that either a switch was turned off or a power outage occurred. The first predetermined voltage output may be a higher voltage output than the second and third predetermined voltage output and correspond to the voltage output of a first power supply. The device may further determine, based on a second rate of change of the voltage, that the power source is a battery.

For example, the device may be coupled to a first power supply powered by an AC line, a second power supply powered by an AC line, and a battery. Under normal operation, the voltage output of the first and second power supplies may stay relatively constant. Therefore, if the device identifies a variance in voltage from a first level to a second level, but stays constant at the second level, then the device may determine that the power source is the second power supply. However, if the device identifies a variance in voltage from a first level or second level to a third level, which varies in accordance with the output voltage variance of a battery versus discharge time, then the device may determine that the device is running on battery power. In some embodiments, the device may further determine, based on the rate of change of the voltage, or differences in voltage from one instances to another instance, the remaining capacity of the battery and/or the health of the battery. The device may determine the state by mapping the rate of change to a battery profile. The battery profile may comprise an output voltage versus discharge time curve or Amp-Hours curve. For example, at full capacity, a NiMH rechargeable 2000 mAH battery cell may have an output voltage of 1.4V. Upon initial discharge at 200 mA, for example, the output voltage of the battery, as measured at the single voltage input of the device, may drop exponentially from 1.4V to 1.25V. After a first period of time, the voltage output may plateau at, e.g., 1.2V, for a second period of time (e.g., 1.8 Amp-Hours). At a third period of time, the voltage output of the battery may drop exponentially to near zero volts. This exponential drop may indicate a deep cycle or deep discharge, which may indicate that the battery is at 80% discharge or at 100% discharge.

At step 225, the device alters its state responsive to the identified change in voltage. The device may enter a battery state, an off state, or an on state. In some embodiments, the device may adjust the amount of power use by, e.g., reducing the intensity of the lighting elements. In some embodiments, the change in voltage may reflect a power source. The first power supply may output 24V DC, the second power supply may output 14V DC and the battery may output 12V DC. If the device measures, at the voltage input, a voltage of 24V DC, then the device may determine to enter the "on" state by turning on the device (e.g., turning on all the lighting elements at full power). Upon identifying a change in voltage from 24V DC to 14V DC, the device may determine that second power supply is providing power. Responsive to determining that second power supply is providing power, the device may turn off (e.g., turn lighting elements off). This may reflect the scenario where first power supply is off and second power supply is on because a user opened a switch with the intention to turn off the device, which the device may identify based on the voltage change.

In another scenario, the device may enter a battery state open identifying the voltage at the voltage input to be 12V DC. This may reflect a power outage resulting in the battery being the only power source that can power the device, essentially providing emergency backup power.

At step 230, the device may control the power use (e.g., intensity level of lighting elements of an LED) based on a minimum required run time. The device, upon identifying the drop in voltage to 12V DC, may reduce the power use (e.g., reduce the intensity level of lighting elements) to conserve battery energy. In some embodiments, the device may determine a minimum run time and adjust the intensity level such that the minimum run time can be met. The device may determine the intensity level by calculating the current ("I") to provide based on the minimum run time ("T"), battery capacity ("C") (full capacity if fully charged or estimated remaining capacity if not at full charge), and the Peukert number ("n") for the battery (which shows how well the battery performs under heavy rates of discharge and typically ranges from 1.1 to 1.4) using the following equation: $I=(C/T)^{(1/n)}$. By reducing the intensity of the lighting elements, the device may reduce the discharge rate I and increase the battery life T In some embodiments, the battery may not be at full capacity at the time the device enters battery state. This may be the result of intermittent power outages where the power does not stay on long enough to fully charge the battery. In some embodiments, the device may estimate the battery capacity based on the voltage output of the battery. For example, the output voltage may be 1.1 volts for a battery with a nominal output voltage of 1.25V at full capacity. Depending on the battery profile (e.g., the variation of voltage with state of charge for the battery type), the device may determine that the battery is at 80% capacity and modify power use (e.g., intensity level of lighting elements) accordingly such that the minimum run time can be met.

In some embodiments, at step 225, the device may enter an off state to maintain the health of the battery. For example, during battery state, the device may identify that the output voltage of the battery has dropped below a threshold level that indicates the battery is entering a deep discharge state. The device may make this determination based on a discharge curve for the battery, which indicates the cell voltage versus the percent of capacity discharged. For example, in an NiMH battery, the cell voltage may be highest above 90% capacity, drop to a constant level between 90% and 20% capacity, and then drop below 20% capacity. As deep discharge may harm the battery, the device may identify the voltage drop when the battery reaches 20% capacity and further reduce the intensity level of the lighting elements or turn off the lighting elements to prevent further battery discharge.

In some embodiments, the device may further account for temperature when determining an intensity level of the lighting elements to meet a minimum required run time. Battery cell performance may change dramatically with temperature because the rate of at which chemical reactions proceed may increase exponentially as temperature rises. Increased temperature may reduce the cell's internal impedance and increase its capacity. High temperatures may also initiate unwanted or irreversible chemical reactions and/or loss of electrolyte which can cause permanent damage or complete failure of the battery. Since the temperature may affect the discharge curve for the battery (e.g., the further the temperature is from room temperature the more the cycle life may be degraded), the device may accordingly further reduce the intensity level of the lighting elements.

Figure 3:
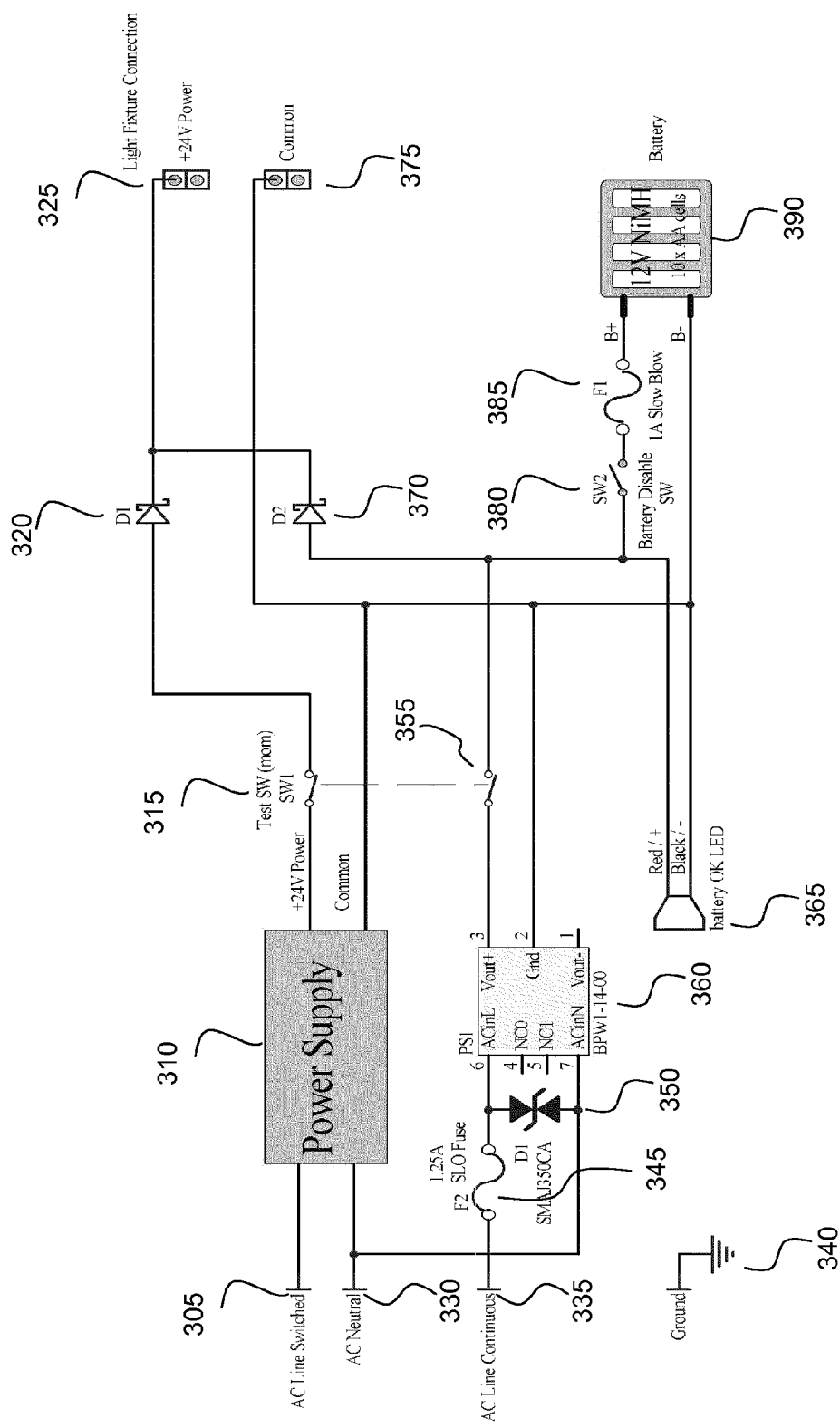
FIG. 3 is an illustrative example of an embodiment of systems and methods for providing multi-state power management.

Referring to FIG. 3 an illustrative example of an embodiment of systems and methods for providing multi-state power management is shown. In brief overview, the system may include a switched AC line 305 and an AC neutral 330 that provide input power to power supply 310. The power supply 310 may include two outputs, a +24V power output and a common. Coupled to the +24V output of the power supply may be a switch 315. Coupled to the switch 315 and the light fixture 325 may be a diode 320 configured to allow electricity to flow from power supply 310 to light fixture 325, under normal operating conditions. The system may include a continuous AC line 335 coupled to a second power supply 360 via a slow fuse 345. Also coupled to the second power supply 360 may be double Zener diodes 350 configured to regulate AC by clipping the input AC waveform to power supply 360 between minimum and maximum voltage values. The Vout+(pin 3) of power supply 360 may be coupled to a switch 355, which may further coupled to a second diode 370. Diode 370 may be coupled to the light fixture 325. The anode end of the diode 370 may be further coupled to a battery 390 via switch 380 and slow fuse 385. Also coupled to battery 390 may be a battery status indictor LED 365 that indicates a status of an aspect of the system (e.g., battery status, temperature status, power supply status, etc.). The system may include a ground 340 and a common reference 375.

In further detail, power supply 310 may include two input wires connected to an switched AC line 305 and an AC neutral 330. The AC neutral 330 may also be connected to the second power supply 360. The AC neutral 330 may refer to a wire ultimately to the earth to receive flow "back" from a device. First power supply 310 may be any type of power supply capable of receiving input AC power and outputting DC power. The output voltage level may be 24V, 28V, or another voltage. The power supply power may also have a common wire. The common wire may be connected to other components of the system. The power supply 310 may be connected to a switch 315. Switch 315 may be a momentary switch that is a center off or on switch that is spring-loaded to return the handle to the center position. For example, for testing purposes, a technician or user of the system may break the circuit by triggering switch 315. Upon releasing the switch 315, the switch may automatically return to an "on" position to allow the flow of electricity. The switch 315 may be connected to a diode 320. The diode 320 may be a Zener Diode which allows current to flow in the forward direction (e.g., from the anode to the cathode) in the same manner as an ideal diode, but will also permit current to flow in the reverse direction (e.g., from the cathode to the anode) when the voltage is above a certain value (e.g., breakdown voltage).

In some embodiments, fixture 325 may comprise a light fixture that can operate on 24V power. The fixture 325 may be configured to control one or more aspect of the system by controlling the amount of power the fixture 325 uses. For example, the fixture 325 may include a plurality of LED lighting elements that can be configured to for various intensity level. At a higher intensity level, the fixture 325 may draw more power, and at lower intensity levels the fixture 325 may draw less power.

The system may include a second power supply 335 connected to a continuous AC line 335 via a fuse 345. A fuse may be a type of low resistance resistor that acts as a sacrificial device to provide overcurrent protection. The fuse 335 may interrupt excessive current so that further damage by overheating or fire is prevented. In some embodiments, fuse 335 may include a slow blow fuse designed to allow harmless short term higher currents but still clear on a sustained overload. The fuse 335 may allow a wide range of currents and not allow a current above a threshold current (e.g., 1.25 Amps). In some embodiments, fuse 335 may automatically restore the circuit after the overload has cleared.

In some embodiments, the circuit may include diodes 350 coupled to two pins of the power supply 360 to provide overvoltage protection. The diodes 350 may include part number SMAJ350CA that provide transient voltage suppression. The diodes 350 may be coupled to the ACinL and ACinN pins of power supply 360. Power supply 360 may include part number BPW1-14-00 which may be a BIAS 1 Watt Power Supply. Power supply 360 may provide output power at 8 or 14 VDC at up to 1 Watt power output. The input voltage range may be from 90 to 308 VAC (50/60 Hz). Power supply 360 may include a plurality of pins to receive input and output signals. Power supply 360 may receive input power at pin 6 (input high) and pin 7 (input low). Pins 4 and 5 may have no connection. Pin 3 may be the output voltage Vout+ and pin 1 may be the Vr output or Vout−. Pin 2 may be ground.

The Vout+ pin 3 of power supply 360 my be connected to a switch 355. The switch 355 may be a momentary switch similar to switch 315. In some embodiments, switch 355 may be connected to switch 315 such that toggling one of switch 315 and switch 355 will also toggle the other. Switch 355 may break the circuit between Vout+ pin 3 of power supply 360 and diode 370. In some embodiments, where switch 315 and switch 355 are connected, toggling the switches to their "off" position may prevent the flow of electricity from both power supply 310 and power supply 360. In this scenario, battery 390 may provide power to light fixture 325. In some embodiments, the circuit may not include switches 315 and 355.

In some embodiments, the output of power supply 360 may be connected to battery 390 to charge battery 390. The power supply 360 may be connected to battery 390 via switch 380 and fuse 385. Switch 380 may be a momentary switch or a switch that stays in the switched position without automatically returning to a center position. Fuse 385 may be similar to use 345 and provide similar functionality. In some embodiments, fuse 385 may have a different current threshold than fuse 345, beyond which the fuse breaks the flow of electricity. Fuse 385 may be connected to battery 390 via a B+ wire of battery 390.

The circuit may include a battery 390 comprising two input/output wires B+ and B−. When the battery is being charged by power supply 360, battery may receive power via B+ and/or B−. When the battery is providing power to light fixture 325, the battery may provide power via B+ and B−. Battery 390 may include a plurality of voltaic cells. In some embodiments, battery 390 may include 10 AA cells to provide a total of 12V output. The battery 390 may be a rechargeable NiMH battery. Other embodiments may have fewer or more cells and may use different battery sizes, e.g., D, C, AAA, AAAA, or 9-volt. In some embodiments, battery 390 may employ different battery chemistry, such as, e.g., Lithium ion, lead-acid, etc.

Figure 4:
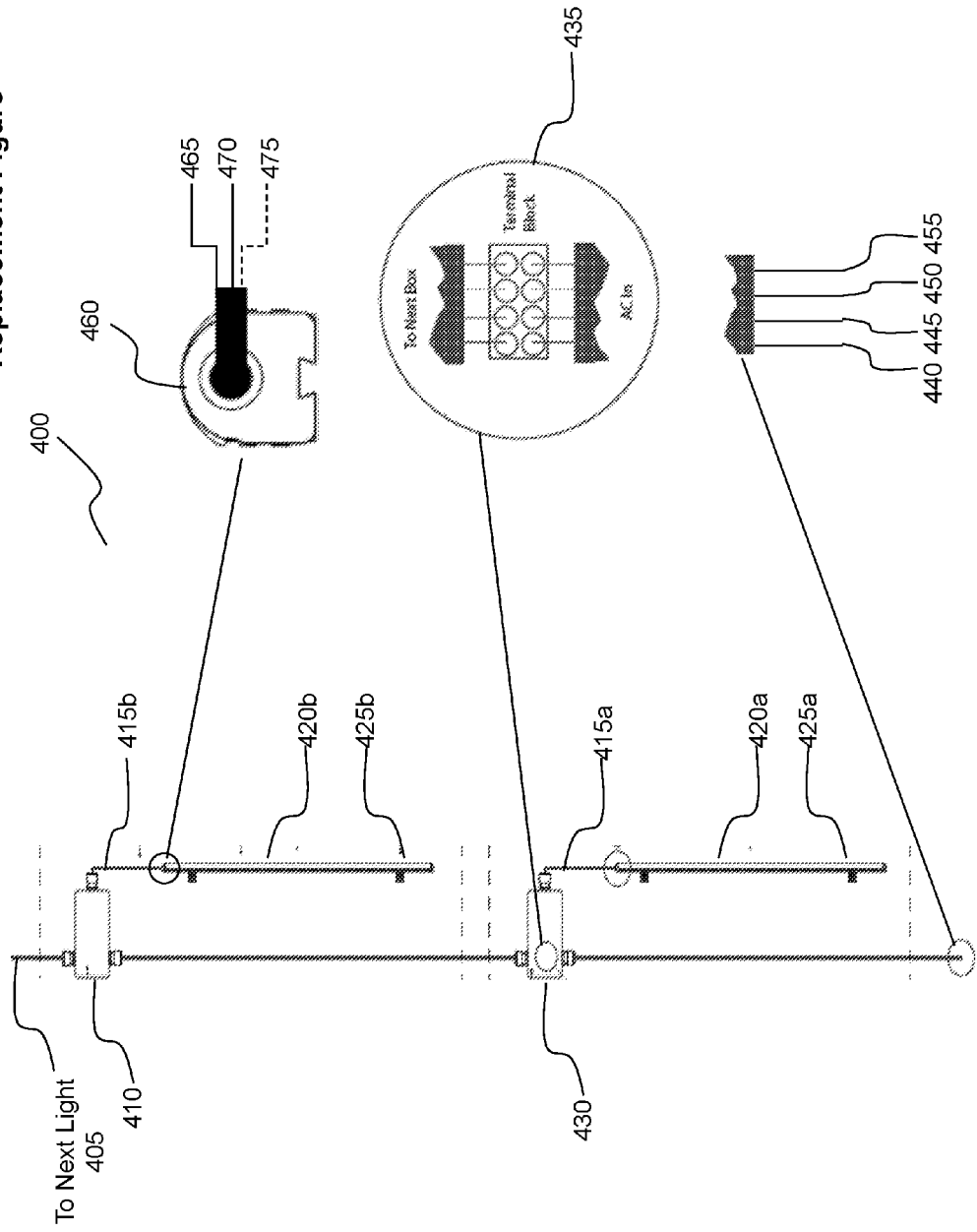
FIG. 4 is an illustrative example deployment of apparatuses, systems, and methods of providing multi-state power management.

Referring to FIG. 4 is an illustrative example windmill deployment of apparatuses, systems and methods of providing multi-state power management. In brief overview, the windmill deployment 400 may include a battery/power junction box 410. The battery/power junction box may be coupled to a battery/power junction box of a next light 405 and/or a battery/power junction box of a previous light 430. The junction boxes 410 and 430 may be coupled to the previous and next junction boxes via a terminal block 435. The terminal block 435 may include a line 1 lighting load wire 440, a line 2 batter load wire 445, a ground 450 and a neutral 455. The junction boxes 410 and 430 may be coupled via wire 415a-b to light emitting diode ("LED") lights 420a-b. The LED lights 420a-b may include an end profile 460 connected the LED lights 420a-b to wires 415a-b. The end profile 460 of LED light 420b may include a DC wire 465 (e.g., that provides 9-30V DC to power the LED) and a common ground wire 470. In some embodiments, the end profile 460 of the LED light 420b may include an optional dimming control wire 475. LED lights 420a-b may be mounted to a surface via mounting clips 425a-b.

In further detail, the battery/power junction box 410 may include a terminal block hookup 435. The junction box 410 may operate in a wide temperature range from −20 to 55 degrees Celsius, for example. In some embodiments, the battery junction box may include a heater to allow the battery junction box 410 to operate in conditions as low as −40 degree Celsius. The junction box 410 may be configured to operate in various environmental conditions, including, e.g., damp locations. The battery junction box 410 may provide various features of the system, including, e.g., 120-plus minutes of battery power at approximately 400 lumens (or another combination of duration and lumens). The battery junction box 410 may provide for automatic switching to battery power upon the loss of AC power. The junction box 410 may provide for intelligent battery management to maximize battery run time. The junction box 410 may comprise one or more test switches and/or indicators. In some embodiments, the battery junction box 410 may be configured to fully charge a battery within 48 hours.

Terminal block 435 may include a line 1 input 440, line 2 input 445, neutral 450 wire, and ground wire 455. Line 1 440 may comprise 120/240 V AC at 50/60 Hz. The current input may include 220 mA at 120V, or 110 mA at 240V for each LED light 420a-b. Line 1 440 may comprise input power 110a or AC line switched 305 discussed herein. Line 1 440 may further comprise an in-line switch to turn LED lights 420a-b on/off.

Terminal block 435 may include a line 2 445. Line 2 445 may provide power to a battery circuit. Line 2 445 may comprise 120/240V AC, 50/60 Hz. Line 2 445 may provide current at 20 mA/120V, 10 mA/240V for each LED light. In some embodiments with a heater, line 2 445 may provide 80 mA/120V or 40 mA/240V. Line 2 445 may comprise input power 110b and/or continuous line 335 described herein. Line 2 445 may provide power to charge the battery of a battery junction box 410 and/or a heater. Upon loss of AC of line 2 445, the system may enter a battery backup mode.

Battery/junction box 410 may be coupled to an LED tower light 420b via cable 415b. Cable 415b may be designed to operate in various conditions (e.g., temperature ranges, water resistances, environmental conditions) and provide various functionality (e.g., maximum current flow, flexibility, length, life cycle) based on the deployment system. In one example, wire 415b may be a 1 meter length cable that is pre-wired to the light and junction box. Cable 415b may be designed and constructed to facilitate operation of the deployment system 400. In some embodiments, cable 415*b* may include one or more of 12 or 14 American wire gauge cable ("AWG"). The AWG of the cable may determine a dimension of the electrically conducting wire, cross-sectional area of which may determine the current-carrying capacity of the wire. The cable 415*b* may include an insulation rated at 0.6/1 kV. The cable 415*b* may be designed to operate between −40 degrees Celsius and 60 degrees Celsius and have a life cycle of 20 years. The cable 415*b* may be designed to tolerate a maximum permanent service temperature of 90 degrees Celsius and a maximum short circuit temperature of 250 degree Celsius. The cable 415*b* may be resistant to water projection in any direction and to intermittent water immersion.

In some embodiments, cable 415*b* may comprise three conductor cables 465, 470 and 475 of 14 AWG that connect to light 420*b* via an end profile 460. Conductor cable 465 may provide 9-30V DC to light 420*b*. Conductor cable 470 may provide a common ground to light 420*b*. In some embodiments, conductor cable 475 may provide dimming control of light 420*b*.

Light 420*b* may include a light source cable of providing visible light. In some embodiments, light 420*b* may be an LED light such as, e.g., an S-Line S1200 linear light. Light 420*b* may receive input power from 9-30V DC and use 6 Watts per foot and be between 12 inches and 48 inches in length. Light 420*b* may be designed to dim from 0 to 100%. The light 420*b* may include active thermal management configured to dim upon overheating to protect the LEDs. Light 420*b* may include mounting brackets 425*b* that are adjustable, fixed, or provide pivoting.

Battery/power junction box 410 may be connected to a next light 405 and/or to a previous light 430. The next light 405 and previous light 430 may have a similar configuration as 410. In some embodiments, the deployment system may include a plurality of lights connected in this manner. In this example, previous light 430 may be a battery/power junction box 430 similar to junction box 410. The battery/power junction box 430 may be connected to cable 415*a* comprising three conductor cables connected to light 420*a* via end terminal 460.

Figure 5:
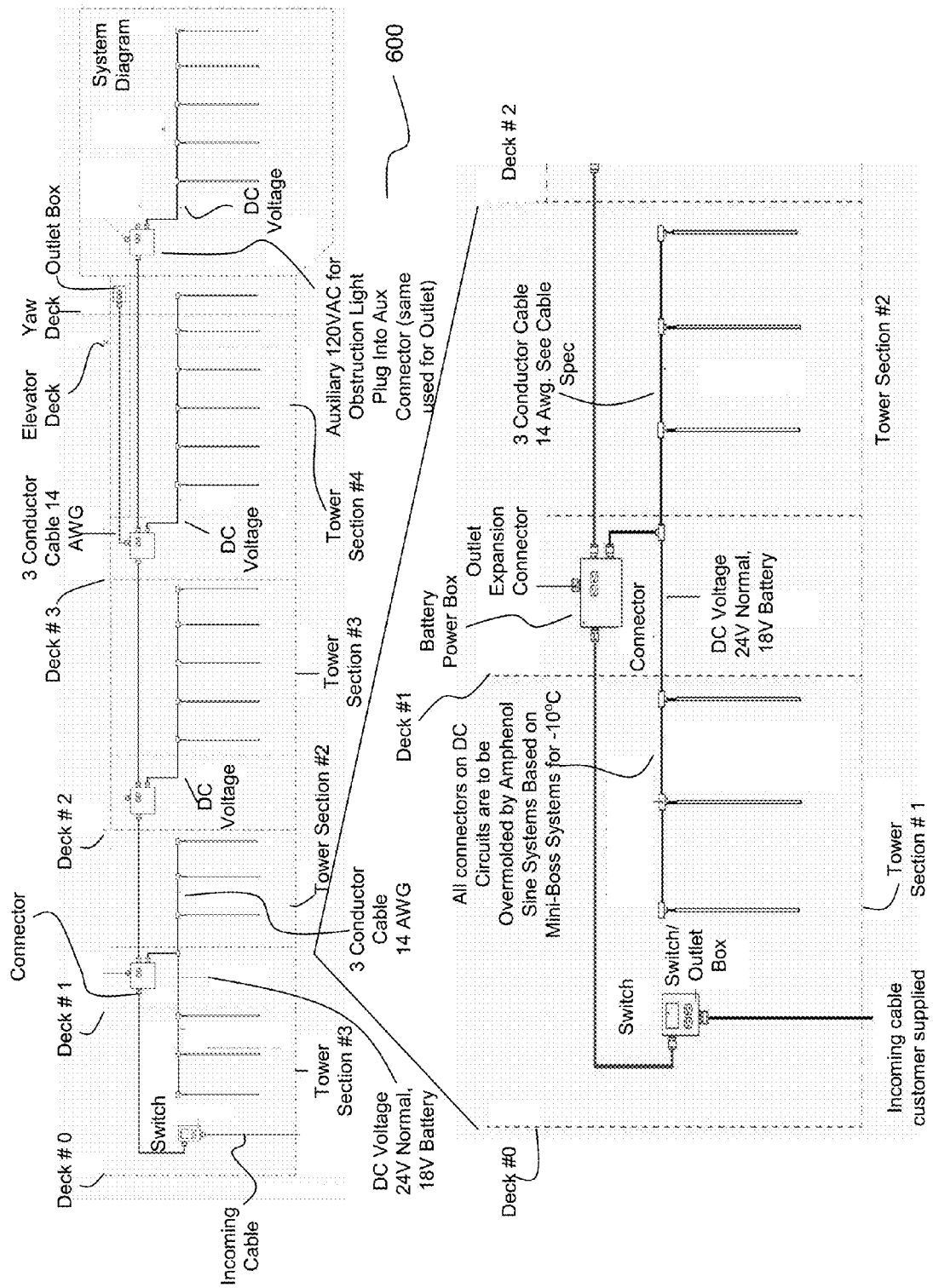
FIG. 5 is an illustrative example of deployment of systems and methods for providing multi-state power management.

Referring to FIG. 5 an illustrative example windmill deployment of apparatuses, systems and methods of providing multi-state power management. The deployment system 600 may comprise a plurality of deployment systems 400 shown in FIG. 4. The deployment system 600 may include a plurality of decks (e.g., 5 decks shown in system 600) that may each include a batter/power junction box and a plurality of LED lights. The deployment system 600 may include a single switch/outlet box to turn on/off the system. The deployment system 600 may comprise of any components described in FIGS. 1-4.

What is claimed:

1. A lighting fixture configured to manage power use, the lighting fixture comprising:
    one or more lighting elements;
    one or more inputs, an input of the one or more inputs comprising a voltage input coupled to the one or more lighting elements, a controller, and a battery, the voltage input configured to provide power to the one or more lighting elements; and
    the controller controlling the one or more lighting elements, the controller configured to:
        receive measurements of voltage at the voltage input coupled to the one or more lighting elements;
        determine changes to a battery status based on differences in the measurements of voltage at the voltage input coupled to the one or more lighting elements; and
        control an intensity level of the one or more lighting elements based on the battery status.

2. The lighting fixture of claim 1, wherein the battery status comprises at least one of charged, charging, trickle charging, discharging, deep cycle, deep discharged, and percentage charge remaining.

3. The lighting fixture of claim 2, wherein the controller determines the battery status is discharging, and, responsive to the determination, reduces the intensity level.

4. The lighting fixture of claim 1, further comprising a temperature sensor, wherein the controller is further configured to:
    obtain, via the temperature sensor, an ambient temperature; and
    control the intensity level of the one or more lighting elements based on the battery status and the ambient temperature.

5. The lighting fixture of claim 4, wherein the controller is further configured to:
    reduce the intensity level upon determining that the ambient temperature is above a first temperature threshold and the battery status comprises discharging.

6. The lighting fixture of claim 4, wherein the controller is further configured to:
    reduce the intensity level upon determining that the ambient temperature is below a second temperature threshold and the battery status comprises discharging.

7. The lighting fixture of claim 4, wherein the controller is further configured to:
    obtain a minimum run time of the one or more lighting elements; and
    select, based on the battery status and the ambient temperature, the intensity level that provides the minimum run time without resulting in a deep discharge battery status.

8. The lighting fixture of claim 1, further comprising:
    a first power supply coupled to the voltage input; and
    a second power supply coupled to the voltage input, the second power supply configured to charge the battery.

9. The lighting fixture of claim 8, wherein the controller is further configured to:
    determine, based on the differences in voltage at the voltage input, that the first power supply and second power supply have been turned off;
    responsive to the first power supply and second power supply being turned off, enter a battery state; and
    reduce the intensity level responsive to entering the battery state, the intensity level being selected based, at least in part, on a minimum run time of the one or more lighting elements.

10. The lighting fixture of claim 8, wherein the controller is further configured to:
    determine, based on the differences in voltage at the voltage input, that the first power supply has been turned off and the second power supply is on;
    responsive to the first power supply being turned off and the second power supply being on, enter an off state.

11. The lighting fixture of claim 8, further comprising a temperature sensor, wherein the controller is further configured to:
    determine, via the temperature sensor, that a temperature of the first power supply is above a power supply temperature threshold; and
    reduce the intensity level of the one or more lighting elements based on the temperature.

12. The lighting fixture of claim 1, further comprising a memory, the controller further configured to:

log into the memory an electronic record comprising a plurality of voltage measurements at the voltage input; and determine, based on the electronic record, at least one of a maximum voltage, a minimum voltage, and an average voltage.

* * * * *